United States Patent
Wei et al.

(10) Patent No.: US 10,999,103 B2
(45) Date of Patent: May 4, 2021

(54) SOUNDING REFERENCE SIGNAL CONFIGURATION FOR HIGH-BAND TRANSMISSION

(71) Applicant: HUAWEI TECHNOLOGIES CO., LTD., Shenzhen (CN)

(72) Inventors: Dongdong Wei, Shanghai (CN); Zhe Liu, Shanghai (CN); Jialing Liu, Chicago, IL (US); Fan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 16/584,883

(22) Filed: Sep. 26, 2019

(65) Prior Publication Data
US 2020/0036556 A1    Jan. 30, 2020

Related U.S. Application Data

(63) Continuation of application No. PCT/CN2018/103507, filed on Aug. 31, 2018.

(30) Foreign Application Priority Data

Sep. 8, 2017   (CN) .......................... 201710806411.3

(51) Int. Cl.
*H04L 12/28*   (2006.01)
*H04L 25/02*   (2006.01)
(Continued)

(52) U.S. Cl.
CPC .......... *H04L 25/0224* (2013.01); *H04L 5/005* (2013.01); *H04L 5/0007* (2013.01);
(Continued)

(58) Field of Classification Search
CPC .......... H04L 25/0224; H04L 25/0226; H04W 24/10; H04W 25/0226; H04W 28/26; H04W 72/0453
(Continued)

(56) References Cited

U.S. PATENT DOCUMENTS

| 10,939,501 | B2* | 3/2021 | Chatterjee | .............. H04W 88/06 |
| 2020/0092055 | A1* | 3/2020 | Choi | ..................... H04L 5/0091 |

FOREIGN PATENT DOCUMENTS

| CN | 107124383 A | 9/2017 |
| WO | 2016163841 A1 | 10/2016 |

(Continued)

OTHER PUBLICATIONS

Huawei: "List of agreements for "SRS Carrier-Based Switching"",3GPP Draft; R1-1613787,Nov. 29, 2016, XP051191618,total 15 pages.
(Continued)

*Primary Examiner* — John Pezzlo
(74) *Attorney, Agent, or Firm* — Kilpatrick Townsend & Stockton LLP

(57) ABSTRACT

Embodiments provide a communication method, a network device, and a terminal device. Under the method, a network device can send SRS configuration information of a first transmission resource and of a second transmission resource to a terminal device. The first transmission resource is a switching source carrier or bandwidth part. The second transmission resource is a switching destination carrier or bandwidth part. The SRS configuration information of the first and second transmission resource includes a first OFDM symbol set and a second OFDM symbol set respectively. Some and all symbols in the first set and second set may be used by the terminal device to send an SRS on the first and second transmission resource respectively. In various embodiments, the network device configures one or (Continued)

more symbols for the terminal device to transmit an SRS, so that high-frequency channel measurement can be better supported.

20 Claims, 12 Drawing Sheets

(51) Int. Cl.
 *H04L 5/00* (2006.01)
 *H04L 27/26* (2006.01)
 *H04W 72/04* (2009.01)
 *H04J 1/16* (2006.01)
(52) U.S. Cl.
 CPC ....... *H04L 27/2613* (2013.01); *H04W 72/042* (2013.01); *H04W 72/0413* (2013.01)
(58) Field of Classification Search
 USPC ................................ 370/252, 278, 329, 430
 See application file for complete search history.

(56) References Cited

FOREIGN PATENT DOCUMENTS

| WO | 2017165751 A1 | 9/2017 |
| WO | 2017197086 A1 | 11/2017 |
| WO | 2017223196 A1 | 12/2017 |
| WO | 2018064376 A1 | 4/2018 |

OTHER PUBLICATIONS

Huawei et al:"SRS subframe design for SRS carrier based switching". 3GPP Draft; R1-164107,May 14, 2016, XP051090095,total 4 pages.

Huawei et al: "UL SRS design for beam management and CSI acquisition",3GPP Draft; R1-1712238,Aug. 20, 2017,XP051315055,total 12 pages.

Huawei et al:"SRS switching among CCs and bandwidth parts",3GPP Draft; R1-1712161,Aug. 20, 2017, XP051314980,total 5 pages.

Huawei et al:"Contents of group-conmon PDCCH", 3GPP Draft; R1-1709953,Jun. 26, 2017,XP051299178,total 4 pages.

Huawei et al,"UL SRS Design for CSI Acquisition and Beam Management", 3GPP TSG RAN WG1 Meeting #87, R1-1611678, Reno, USA, Nov. 14-18, 2016, total 5 pages.

Samsung,"DCI Contents for NR", 3GPP TSG RAN WG1 Meeting #89, R1-1707995, Hangzhou, China, May 15-19, 2017, total 5 pages.

\* cited by examiner

SOUNDING REFERENCE SIGNAL CONFIGURATION FOR HIGH-BAND TRANSMISSION

CROSS-REFERENCE TO RELATED APPLICATIONS

This application is a continuation of International Application No. PCT/CN2018/103507, filed on Aug. 31, 2018, which claims priority to Chinese Patent Application No. 201710806411.3, filed on Sep. 8, 2017. The disclosures of the aforementioned applications are hereby incorporated by reference in their entireties.

TECHNICAL FIELD

This application relates to the communications field, and in particular, to a communication method, a network device, and a terminal device.

BACKGROUND

In a current communications system, to perform uplink channel measurement, a sounding reference signal (sounding reference signal, SRS) is introduced.

When uplink and downlink services are asymmetrical, a downlink service data volume is much greater than an uplink service data volume, and a time division duplex (time division duplex, TDD) carrier is configured for a user, a plurality of TDD carriers are configured for downlink transmission, and a quantity of downlink carriers is greater than a quantity of uplink carriers. Some TDD carriers are configured for downlink transmission only, and there is no uplink data/reference signal transmission. Therefore, a base station cannot accurately obtain downlink transmission channel information based only on channel state information (channel quality information, CQI) reported by the user. To resolve this problem, an SRS carrier-based switching (carrier-based switching) feature (SRS switching for short) is supported in the current communications system.

In the prior art, in a normal uplink subframe, a unit for SRS resource configuration is one orthogonal frequency division multiplexing (orthogonal frequency division multiplexing, OFDM) symbol, and an SRS is usually sent on a last OFDM symbol in a subframe. Because a quantity and locations of transmission symbols of the SRS are fixed, a channel measurement requirement of a terminal device during high-band transmission cannot be met.

SUMMARY

A communication method, a network device, and a terminal device in embodiments of this application can provide an SRS transmission manner in an SRS switching scenario, so that a channel measurement requirement of the terminal device during high-band transmission can be met.

A first aspect of various embodiments provides a communication method, where the method includes:

sending, by a network device, SRS configuration information of a first transmission resource and SRS configuration information of a second transmission resource to a terminal device. The first transmission resource supports transmission of at least one of a physical uplink control channel (physical uplink control channel, PUCCH), a physical uplink shared channel (physical uplink share channel, PUSCH), a physical random access channel (physical random access channel, PRACH), or an SRS signal. In addition, the first transmission resource may be a first carrier, or may be a first bandwidth part. In other words, the first transmission resource is a switching source carrier or a switching source bandwidth part during SRS switching. The second transmission resource does not support a PUCCH or a PUSCH. In addition, the second transmission resource includes a second carrier or a second bandwidth part. In other words, the second transmission resource is a switching destination carrier or a switching destination bandwidth part during SRS switching.

The SRS configuration information of the first transmission resource includes a first OFDM symbol set, namely, a first SRS candidate set. All or some OFDM symbols in the first OFDM symbol set are used by the terminal device to send an SRS on the first transmission resource. In other words, a time domain resource used by the terminal device to send an SRS on the first transmission resource is a subset in the first OFDM symbol set.

The SRS configuration information of the second transmission resource includes a second OFDM symbol set, namely, a second SRS candidate set. All or some OFDM symbols in the second OFDM symbol set are used by the terminal device to send an SRS on the second transmission resource. In other words, a time domain resource used by the terminal device to send an SRS on the second transmission resource is a subset in the second OFDM symbol set.

In this embodiment, in an SRS switching scenario, the SRS configuration information configured by the network device for the terminal device includes an OFDM symbol set of different carriers or bandwidth parts. The OFDM symbol set includes one or more OFDM symbols that may be used to transmit an SRS. Therefore, a channel can be measured by using a plurality of SRSs on one carrier or one bandwidth part, so that high-frequency channel measurement can be better supported, thereby improving channel measurement efficiency.

Optionally, an SRS candidate set is related to a carrier type or a bandwidth part type, and the first OFDM symbol set and the second OFDM symbol set are different.

Optionally, in another embodiment, the network device may not send the SRS configuration information of the first transmission resource and the SRS configuration information of the second transmission resource to the terminal device, but the first OFDM symbol set and the second OFDM symbol set are predefined by using a protocol, and the first OFDM symbol set and the second OFDM symbol set are different.

It should be noted that, the first OFDM symbol set and the second OFDM symbol set are OFDM symbol sets used to specify an SRS that can be sent by the terminal device. The network device needs to configure, by using other signaling or indication information, some symbols that are in the OFDM symbol set and on which the terminal device specifically sends an SRS, a type of the SRS to be sent, and information such as another resource configuration required for sending the SRS. For example, the network device performs the configuration by using RRC signaling or a DCI indication.

Optionally, that the first OFDM symbol set and the second OFDM symbol set are different may be that quantities of OFDM symbols are different, or may be that locations of OFDM symbols are different, or both quantities and locations of OFDM symbols are different.

In this embodiment, a possibility that UE transmits an SRS by using symbols at different locations and/or with different quantities on the first transmission resource and the second transmission resource can be increased by configuring different carrier types (or different bandwidth part types) or predefining different SRS candidate sets during SRS switching, so that on one hand, a probability that the SRS is affected by radio frequency retuning (radio frequency retuning, RF retuning) on the first transmission resource can be reduced, and on the other hand, impact of the RF retuning on other channels received and sent on the first transmission resource can be reduced.

Optionally, the first OFDM symbol set includes a first OFDM symbol subset and a second OFDM symbol subset. All or some OFDM symbols in the first OFDM symbol subset are used by the terminal device to send a periodic SRS or a semi-persistent SRS on the first transmission resource. In other words, a time domain resource used by the terminal device to send a periodic SRS and a semi-persistent SRS on the first transmission resource is a subset of the first OFDM symbol subset. All or some OFDM symbols in the second OFDM symbol subset are used by the terminal device to send an aperiodic SRS on the first transmission resource. In other words, a time domain resource used by the terminal device to send an aperiodic SRS on the first transmission resource is a subset of the first OFDM symbol subset. The first OFDM symbol subset and the second OFDM symbol subset are different.

It should be noted that, the first OFDM symbol subset and the second OFDM symbol subset may be different in a condition in which the first OFDM symbol set and the second OFDM symbol set are the same, or the first OFDM symbol subset and the second OFDM symbol subset may be different in a condition in which the first OFDM symbol set and the second OFDM symbol set are different.

Optionally, the second OFDM symbol set includes a third OFDM symbol subset and a fourth OFDM symbol subset. All or some OFDM symbols in the third OFDM symbol subset are used by the terminal device to send a periodic SRS or a semi-persistent SRS on the second transmission resource. In other words, a time domain resource used by the terminal device to send a periodic SRS and a semi-persistent SRS on the second transmission resource is a subset of the third OFDM symbol subset. All or some OFDM symbols in the fourth OFDM symbol subset are used by the terminal device to send an aperiodic SRS on the second transmission resource. In other words, a time domain resource used by the terminal device to send an aperiodic SRS on the second transmission resource is a subset of the fourth OFDM symbol subset. The third OFDM symbol subset and the fourth OFDM symbol subset are different.

It should be noted that, the third OFDM symbol subset and the fourth OFDM symbol subset may be different in a condition in which the first OFDM symbol set and the second OFDM symbol set are the same, or the third OFDM symbol subset and the fourth OFDM symbol subset may be different in a condition in which the first OFDM symbol set and the second OFDM symbol set are different.

In this embodiment, different candidate sets may be configured or predefined for different types of SRSs. Usually, the aperiodic SRS is used to obtain a channel condition on a segment of frequency domain in which a network side is interested, and is usually a narrowband SRS. The periodic SRS and the semi-persistent SRS are used to obtain channel conditions of all channels on an entire system bandwidth. Therefore, corresponding SRS transmission symbols can be configured based on features of different types of SRSs, thereby reducing impact on a channel on a switching source carrier.

Optionally, in another implementation, the first OFDM symbol subset, the second OFDM symbol subset, the third OFDM symbol subset, and the fourth OFDM symbol subset may be alternatively predefined by using a protocol, the first OFDM symbol subset and the second OFDM symbol subset are different, and the third OFDM symbol subset and the fourth OFDM symbol subset are different.

Optionally, the impact of the RF retuning is considered, a shorter period should be configured for the SRS and fewer symbols should be sent on the switching source carrier or the switching source bandwidth part, and a longer period should be configured for the SRS and a larger quantity of symbols should be sent each time on the switching destination carrier or the switching destination bandwidth part. In this way, impact of a conflict on SRS transmission on the switching source carrier can be reduced. Therefore, in the SRS configuration information, a quantity of OFDM symbols in the third OFDM symbol subset is set to be greater than a quantity of OFDM symbols in the first OFDM symbol subset.

Optionally, the aperiodic SRS is usually used to obtain a channel condition on a segment of frequency domain in which a network side is interested, and is usually a narrowband SRS. Therefore, a small candidate set may be set to transmit the aperiodic SRS. The periodic SRS and the semi-persistent SRS are usually used to obtain channel conditions of all channels on an entire system bandwidth. Therefore, a large candidate set may be set to transmit the periodic SRS and the semi-persistent SRS. Therefore, in the SRS configuration information, a quantity of OFDM symbols in the third OFDM symbol subset is set to be less than a quantity of OFDM symbols in the fourth OFDM symbol subset. In other words, on the second transmission resource, a quantity of symbols that can be used by the terminal device to send the aperiodic SRS is less than a quantity of symbols that can be used to send the periodic SRS and/or the semi-persistent SRS.

Similarly, in this embodiment, in the SRS configuration information, a quantity of OFDM symbols in the first OFDM symbol subset may be set to be less than a quantity of OFDM symbols in the second OFDM symbol subset. In other words, on the first transmission resource, a quantity of symbols that can be used by the terminal device to send the aperiodic SRS is less than a quantity of symbols that can be used to send the periodic SRS and/or the semi-persistent SRS.

Optionally, the communication method in this embodiment further includes: sending, by the network device, group downlink control information (group downlink control information, group DCI) to the terminal device, where the group DCI includes indication information used to indicate one or more terminal devices, the indication information includes SRS symbol location information of the terminal device, and the SRS symbol location information is used to indicate an OFDM symbol location at which the terminal device sends the aperiodic SRS on the second transmission resource.

Optionally, the SRS symbol location information may be a location of the sent aperiodic SRS (aperiodic SRS, A-SRS) in the second OFDM symbol subset, or may be a location of the sent A-SRS in the fourth OFDM symbol subset. This is not limited herein. Optionally, the SRS location information may include a quantity of SRS symbols and a number of a symbol for sending an SRS.

In this embodiment, a symbol location of the A-SRS is indicated in the group DCI, so that a quantity and locations of symbols used by the terminal device to send the aperiodic SRS can be flexibly configured, thereby meeting SRS transmission requirements in different scenarios.

Optionally, the group DCI sent by the network device to the terminal device may indicate precoding information or a codebook of the terminal device, and the precoding information or the codebook is used to indicate precoding or a codebook used by the terminal device to send the aperiodic SRS on the second transmission resource.

In this embodiment, during an SRS switching operation, an SRS precoding codebook is indicated, so that SRS transmission performance on a carrier having neither a PUCCH nor a PUSCH can be improved, thereby meeting transmission requirements in different scenarios.

Optionally, the group DCI sent by the network device to the terminal device may indicate beam index information of the terminal device, and the beam index information is used to indicate a beam index or a beam pair index used by the terminal device to send the aperiodic SRS on the second transmission resource.

In this embodiment, during an SRS switching operation, the beam index or the beam pair index for the SRS is indicated, so that SRS transmission performance on a carrier having neither a PUCCH nor a PUSCH can be improved, thereby meeting transmission requirements in different scenarios.

Optionally, the group DCI is transmitted in a common PDCCH or a group common PDCCH.

According to a second aspect, an embodiment provides a communication method, where the method includes: obtaining, by a terminal device, SRS configuration information on a first transmission resource and SRS configuration information on a second transmission resource, where the first transmission resource supports transmission of at least one of a physical uplink control channel PUCCH, a physical uplink shared channel PUSCH, a physical random access channel PRACH, or an SRS signal, the second transmission resource does not support a PUCCH or a PUSCH, the first transmission resource includes a first carrier or a first bandwidth part, the second transmission resource includes a second carrier or a second bandwidth part, and the SRS configuration information of the first transmission resource includes a first orthogonal frequency division multiplexing OFDM symbol set; and sending, by the terminal device, an SRS on the first transmission resource by using all or some OFDM symbols in the first OFDM symbol set, where the SRS configuration information of the second transmission resource includes a second OFDM symbol set; and sending, by the terminal device, an SRS on the second transmission resource by using all or some OFDM symbols in the second OFDM symbol set.

Optionally, a manner of obtaining, by a terminal device, SRS configuration information on a first transmission resource and SRS configuration information on a second transmission resource may be: predefining the SRS configuration information on the first transmission resource and the SRS configuration information on the second transmission resource by using a protocol; in other words, predefining the first OFDM symbol set and the second OFDM symbol set by using a protocol. The terminal device transmits the SRS on the first transmission resource and the second transmission resource respectively based on the SRS configuration information of the first transmission resource and the SRS configuration information of the second transmission resource.

Optionally, a manner of obtaining, by a terminal device, SRS configuration information on a first transmission resource and SRS configuration information on a second transmission resource may be alternatively: receiving the SRS configuration information on the first transmission resource and the SRS configuration information on the second transmission resource that are sent by a network device, to obtain the first OFDM symbol set and the second OFDM symbol set. Optionally, the network device may broadcast the SRS configuration information, and the terminal device may receive the SRS configuration information on the first transmission resource and the SRS configuration information on the second transmission resource that are broadcast by the network device. Alternatively, the network device may send the SRS configuration information to the terminal device by using RRC signaling, and the terminal device may receive the SRS configuration information on the first transmission resource and the SRS configuration information on the second transmission resource that are sent by the network device by using the RRC signaling.

It should be noted that, the first OFDM symbol set and the second OFDM symbol set are OFDM symbol sets used to specify an SRS that can be sent by the terminal device. The network device needs to configure, by using other signaling or indication information, some symbols that are in the OFDM symbol set and on which the terminal device specifically sends an SRS, a type of the SRS to be sent, and information such as another resource configuration required for sending the SRS. For example, the network device performs the configuration by using RRC signaling or a DCI indication.

Optionally, the first OFDM symbol set and the second OFDM symbol set are different.

Optionally, the first OFDM symbol set includes a first OFDM symbol subset and a second OFDM symbol subset, the first OFDM symbol subset and the second OFDM symbol subset are different, the terminal device sends a periodic SRS or a semi-persistent SRS on the first transmission resource by using all or some OFDM symbols in the first OFDM symbol subset, and the terminal device sends an aperiodic SRS on the first transmission resource by using all or some OFDM symbols in the second OFDM symbol subset.

Optionally, the second OFDM symbol set includes a third OFDM symbol subset and a fourth OFDM symbol subset, and the third OFDM symbol subset and the fourth OFDM symbol subset are different. The method further includes: sending, by the terminal device, a periodic SRS or a semi-persistent SRS on the second transmission resource by using all or some OFDM symbols in the third OFDM symbol subset; and sending, by the terminal device, an aperiodic SRS on the second transmission resource by using all or some OFDM symbols in the fourth OFDM symbol subset.

Optionally, in another implementation, the first OFDM symbol subset, the second OFDM symbol subset, the third OFDM symbol subset, and the fourth OFDM symbol subset may be alternatively predefined by using a protocol, the first OFDM symbol subset and the second OFDM symbol subset are different, and the third OFDM symbol subset and the fourth OFDM symbol subset are different.

Optionally, when the first OFDM symbol set and the second OFDM symbol set are the same, the first OFDM symbol subset and the second OFDM symbol subset may be different, and the third OFDM symbol subset and the fourth OFDM symbol subset may be different. Alternatively, when the first OFDM symbol set and the second OFDM symbol set are different, the first OFDM symbol subset and the second OFDM symbol subset may be different, and the third OFDM symbol subset and the fourth OFDM symbol subset may be different.

Optionally, a quantity of OFDM symbols in the third OFDM symbol subset is greater than a quantity of OFDM symbols in the first OFDM symbol subset.

Optionally, a quantity of OFDM symbols in the third OFDM symbol subset is less than a quantity of OFDM symbols in the fourth OFDM symbol subset.

Optionally, the method further includes: receiving, by the terminal device, group downlink control information group DCI sent by the network device, where the group DCI includes indication information used to indicate one or more terminal devices, the indication information includes SRS symbol location information of the terminal device, and the SRS symbol location information is used to indicate an OFDM symbol location at which the terminal device sends the aperiodic SRS on the second transmission resource.

Optionally, the SRS symbol location information may be a location of the sent A-SRS in the second OFDM symbol set, or may be a location of the sent A-SRS in the fourth OFDM symbol subset. This is not limited herein.

Optionally, the group DCI may alternatively include precoding information or a codebook of the terminal device, and the precoding information or the codebook is used to indicate precoding or a codebook used by the terminal device to send the aperiodic SRS on the second transmission resource.

Optionally, the group DCI may alternatively include beam index information of the terminal device, and the beam index information is used to indicate a beam index or a beam pair index used by the terminal device to send the aperiodic SRS on the second transmission resource.

Optionally, the group DCI is transmitted in a common PDCCH or a group common PDCCH.

According to a third aspect, an embodiment further provides a network device, to specifically implement a function corresponding to the communication method provided in the first aspect. The function may be implemented by hardware, or by hardware executing a corresponding software program. The hardware and software include one or more unit modules corresponding to the function. The unit module may be software and/or hardware.

In a possible design, the network device includes a sending unit and a receiving unit, where the sending unit is configured to:

send SRS configuration information of a first transmission resource and SRS configuration information of a second transmission resource to a terminal device, where the first transmission resource supports transmission of at least one of a physical uplink control channel PUCCH, a physical uplink shared channel PUSCH, a physical random access channel PRACH, or an SRS signal, the second transmission resource does not support a PUCCH or a PUSCH, the first transmission resource includes a first carrier or a first bandwidth part, the second transmission resource includes a second carrier or a second bandwidth part, the SRS configuration information of the first transmission resource includes a first OFDM symbol set, all or some OFDM symbols in the first OFDM symbol set are used by the terminal device to send an SRS on the first transmission resource, the SRS configuration information of the second transmission resource includes a second OFDM symbol set, and all or some OFDM symbols in the second OFDM symbol set are used by the terminal device to send an SRS on the second transmission resource.

In a possible design, the network device includes:

a transceiver, a processor, and a memory that are connected to one another, where the memory is configured to store program code, and the processor invokes the program code in the memory, to perform the steps performed by the network device in the first aspect.

According to a fourth aspect, an embodiment further provides a terminal device, to specifically implement a function corresponding to the communication method provided in the second aspect. The function may be implemented by hardware, or by hardware executing a corresponding software program. The hardware and software include one or more unit modules corresponding to the function. The unit module may be software and/or hardware.

In a possible design, the terminal device includes:

an obtaining unit, configured to obtain SRS configuration information on a first transmission resource and SRS configuration information on a second transmission resource, where the first transmission resource supports transmission of at least one of a physical uplink control channel PUCCH, a physical uplink shared channel PUSCH, a physical random access channel PRACH, or an SRS signal, the second transmission resource does not support a PUCCH or a PUSCH, the first transmission resource includes a first carrier or a first bandwidth part, the second transmission resource includes a second carrier or a second bandwidth part, the SRS configuration information of the first transmission resource includes a first OFDM symbol set, and the SRS configuration information of the second transmission resource includes a second OFDM symbol set; and a sending unit, configured to send an SRS on the first transmission resource by using all or some OFDM symbols in the first OFDM symbol set; or send an SRS on the second transmission resource by using all or some OFDM symbols in the second OFDM symbol set.

In a possible design, the terminal device includes:

a transceiver, a processor, and a memory that are connected to one another, where the memory is configured to store program code, and the processor invokes the program code in the memory, to perform the steps to be performed for operating the terminal device in the second aspect.

According to a fifth aspect, this application provides a computer-readable storage medium, and the computer-readable storage medium stores an instruction. When the instruction is executed on a computer, the computer performs the methods in the foregoing aspects.

According to a sixth aspect, this application provides a computer program product that includes an instruction, where when the computer program product runs on a computer, the computer performs the methods in the foregoing aspects.

According to a seventh aspect, an embodiment provides a communications apparatus, where the communications apparatus may include an entity such as a terminal device or a chip. The communications apparatus includes a processor and a memory. The memory is configured to store an instruction. The processor is configured to execute the instruction in the memory, so that the communications apparatus performs the method according to either the first aspect or the second aspect.

According to an eighth aspect, this application provides a chip system, where the chip system includes a processor, configured to support a network device in implementing a function in the foregoing aspects, or support a terminal device in implementing a function in the foregoing aspects, for example, sending or processing data and/or information in the method. In a possible design, the chip system further includes a memory. The memory is configured to store a program instruction and data that are necessary for the network device. The chip system may include a chip, or may include a chip and another discrete device.

It can be learned from the foregoing technical solutions that, various embodiments have the following advantages:

In various embodiments, in an SRS switching scenario, the SRS configuration information configured by the network device for the terminal device includes an OFDM symbol set. The OFDM symbol set includes one or more OFDM symbols that may be used to transmit an SRS. Therefore, a channel can be measured by using a plurality of SRSs on one carrier or one bandwidth part, so that high-frequency channel measurement can be better supported, thereby improving channel measurement efficiency. In addition, in various embodiments, the first OFDM symbol set of the first transmission resource and the second OFDM symbol set of the second transmission resource are different, so that impact on various channels on the first transmission resource can be reduced.

DESCRIPTION OF EMBODIMENTS

The following further describes in detail various embodiments with reference to the accompanying drawings.

To resolve a prior-art problem that an SRS in a communications system cannot meet a channel measurement requirement of a terminal device during high-band transmission. The embodiments of this application provide a solution based on a communications system shown in FIG. 1, to better support measurement of a high-frequency channel, thereby improving channel measurement efficiency.

Figure 1:
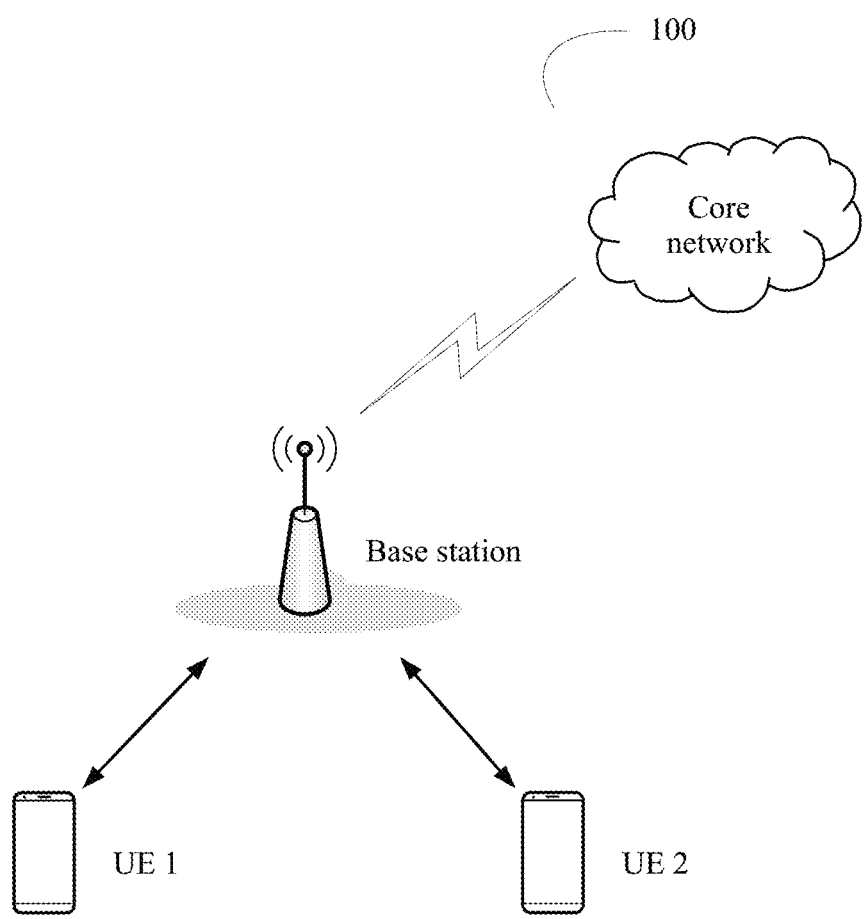
FIG. 1 is a schematic diagram of a communications system according to an embodiment.

As shown in FIG. 1, an embodiment provides a communications system 100. The communications system 100 includes a core network, at least one base station, and at least one terminal device (also referred to as user equipment (user equipment, UE)). The figure shows only one base station and UE 1 and UE 2 within coverage of the base station. The base station provides a wireless access service for a plurality of UEs within coverage of the base station. The UE may communicate with the base station through a link. The base station is connected to the core network. The core network may include a network device such as a mobility management entity (mobility management entity, MME), a home subscriber server (home subscriber server, HSS), or a serving gateway (serving gateway, SGW).

In this embodiment, the communications system 100 may be various radio access technology (radio access technology, RAT) systems, for example, a code division multiple access (code division multiple access, CDMA) system, a time division multiple access (time division multiple access, TDMA) system, a frequency division multiple access (frequency division multiple access, FDMA) system, an orthogonal FDMA (orthogonal frequency division multiple access, OFDMA) system, a single carrier frequency division multiple access (single carrier FDMA, SC-FDMA) system, and another system. The terms "system" and "network" can be interchanged with each other. A radio technology such as universal terrestrial radio access (universal terrestrial radio access, UTRA) or CDMA 2000 may be implemented in the CDMA system. The UTRA includes a wideband CDMA (wideband CDMA, W-CDMA) technology and another variant technology of CDMA. CDMA2000 covers interim standard (interim standard, IS) 2000 (IS-2000), IS-95, and IS-856 standards. A TDMA system may implement a wireless technology such as global system for mobile communications (global system for mobile communication, GSM). An OFDMA system may implement wireless technologies such as evolved UTRA (evolved UTRA, E-UTRA), ultra mobile broadband (ultra mobile broadband, UMB), IEEE 802.11 (Wi-Fi), IEEE 802.16 (WiMAX), IEEE 802.20, and Flash-OFDM. UTRA and E-UTRA are parts of a universal mobile telecommunications system (universal mobile telecommunications system, UMTS). 3GPP is a novel release of UMTS using E-UTRA in long term evolution (long term evolution, LTE) and various evolved releases based on LTE. In addition, the communications system 100 is further applicable to a future-oriented communications technology, such as a 5G system. System architectures and service scenarios described in this embodiment are intended to describe the technical solutions in this embodiment more clearly, but are not intended to limit the technical solutions provided in this embodiment. Persons skilled in the art may know that, as network architectures evolve and a new service scenario emerges, the technical solutions provided in this embodiment are also applicable to a similar technical problem. The base station in this embodiment is an apparatus that is deployed in a radio access network and that provides a wireless communication function for the UE. The base station may include a macro base station, a micro base station (which may also be referred to as a small cell), a relay station, an access point, and the like in various forms. A device having a base station function may have different names in systems using different radio access technologies, and may be a base transceiver (base transceiver station, BTS) in GSM or CDMA, or may be a NodeB (nodeB) in W-CDMA, or may be an evolved NodeB (evolved NodeB, or eNB or e-NodeB) in LTE, or may be a next-generation new radio communications system (new radio, NR), namely, a transmit-receive point (transmit-receive point, TRP), a gNodeB, or the like in a 5G system. For ease of description, in this embodiment, all the foregoing apparatuses that provide a wireless communications function for the UE are collectively referred to as a base station.

The UE in this embodiment may include various terminal devices that have a wireless communication function, may communicate with one or more core networks by using a radio access network (radio access network, RAN), and provide voice and/or data connectivity for a user. The UE may be referred to as a terminal for short. The UE may be a handheld device, an in-vehicle device, a wearable device, or a computing device having a wireless communication function, or another processing device connected to a wireless modem. In this embodiment, the UE may also be referred to as a subscriber unit (subscriber unit), a subscriber station (subscriber station), a mobile station (mobile station), a mobile console (mobile), a remote station (remote station), a remote terminal (remote terminal), an access terminal (access terminal), a user terminal (user terminal), a user agent (user agent), a user device (user device), a personal communication service (personal communication service, PCS) phone, a cordless phone, a mobile phone, a "cellular" phone, a smartphone (smart phone), a wireless local loop (wireless local loop, WLL) station, a personal digital assistant (personal digital assistant, PDA), or another device. In this embodiment, the devices mentioned above are collectively referred to as UE.

It should be noted that, a quantity and types of UEs included in the communications system 100 in FIG. 1 are merely an example, and this embodiment is not intended to be limiting. For example, the communications system 100 may further include more UEs that communicate with the base station. In addition, the communications system 100 may not be limited to including the core network, the base station, and the UE, and for example, may further include a device for carrying a virtualized network function, or the like. These are obvious for persons skilled in the art. Details are not described herein.

In various embodiments, based on the communications system 100 shown in FIG. 1, an SRS transmission method in an SRS switching scenario is provided, to improve channel measurement efficiency.

For ease of understanding of the technical solutions in various embodiments, the technologies related to this application are first briefly described as follows.

An SRS in various embodiments is a reference signal transmitted by UE on an uplink, and is a signal used to measure wireless channel information (channel state information, CSI) between a terminal device and a base station. In a communications system, the SRS mainly has the following functions: (1). channel sounding, used by a base station side to measure uplink wireless channel quality; (2). frequency selective scheduling; (3). performing uplink timing control on the UE, and maintaining synchronization; and (4). in a TDD scenario, performing downlink transmission with assistance of reciprocity of uplink and downlink channels by using channel information measured by using the SRS.

The communications system in various embodiments supports transmission of three types of SRSs in total: a periodic SRS (periodic SRS, P-SRS), an aperiodic SRS (aperiodic SRS, A-SRS), and a semi-persistent SRS (semi-persistent scheduling SRS, SPS-SRS).

The periodic SRS is an SRS that is sent once every configured SRS period based on the SRS period. For the periodic SRS, a time domain resource, a frequency domain resource, a code domain resource, and a comb (comb) resource used for SRS transmission are configured by using radio resource control (radio resource control, RRC) signaling. The time domain resource includes an SRS period, an SRS sending slot (slot), and an orthogonal frequency division multiplexing (orthogonal frequency division multiplexing, OFDM) symbol used for sending the SRS.

For the aperiodic SRS, a time domain resource, a frequency domain resource, a code domain resource, and a comb resource used for SRS transmission are configured by using RRC signaling. The time domain resource used for SRS transmission is not fixed, and downlink control information (downlink control information, DCI) triggers a terminal device to send an SRS.

For the semi-persistent SRS, a time domain resource, a frequency domain resource, a code domain resource, and a comb resource used for SRS transmission are configured by using RRC signaling. The time domain resource includes an SRS period, an SRS sending slot, and an OFDM symbol used for sending the SRS. DCI triggers the terminal device to send an SRS once every configured SRS period based on the SRS period. In addition, the DCI may further trigger the terminal device to stop sending the SRS.

This embodiment supports carrier-based SRS switching (SRS carrier based switching) in a carrier aggregation scenario. The carrier aggregation means that a user can perform uplink and downlink transmission by using several carriers at the same time based on a capability of the user. In this case, duplex modes of different carriers may be flexibly configured. To be specific, the duplex modes may all be frequency division duplex (frequency division duplexing, FDD) or may all be TDD, or the carriers may be FDD and TDD carriers. When uplink and downlink services are asymmetrical, a downlink service data volume is much greater than an uplink service data volume, and a TDD carrier is configured for a user, a plurality of TDD carriers are configured for downlink transmission, and a quantity of downlink carriers is greater than a quantity of uplink carriers. Some TDD carriers are configured for only downlink transmission, and there is no uplink data/reference signal transmission. Therefore, a base station cannot accurately obtain downlink transmission channel information based only on reciprocity of uplink and downlink channels. In this embodiment, a carrier on which only an SRS exists may be periodically/aperiodically switched to based on a carrier SRS switching feature, and downlink transmission on the carrier is performed with assistance of SRS channel measurement performance and reciprocity of uplink and downlink channels in a TDD scenario. For example, the base station may select, based on an SRS measurement result, a beam with better directivity or a narrower beam to perform downlink data transmission for a user, to improve transmission reliability and a transmission rate.

The carrier-based SRS switching feature is as follows: N carriers are configured for UE. Because an uplink capability of the UE is insufficient, simultaneous transmission on only M uplink carriers can be supported. To obtain an accurate downlink channel state of a TDD carrier in N-M carriers, a radio frequency (radio frequency, RF) capability of the M uplink carriers needs to be used. To be specific, an uplink carrier unit (component carrier, CC) in the M uplink carriers is switched to a TDD carrier in the N-M carriers to send an SRS.

Figure 2:
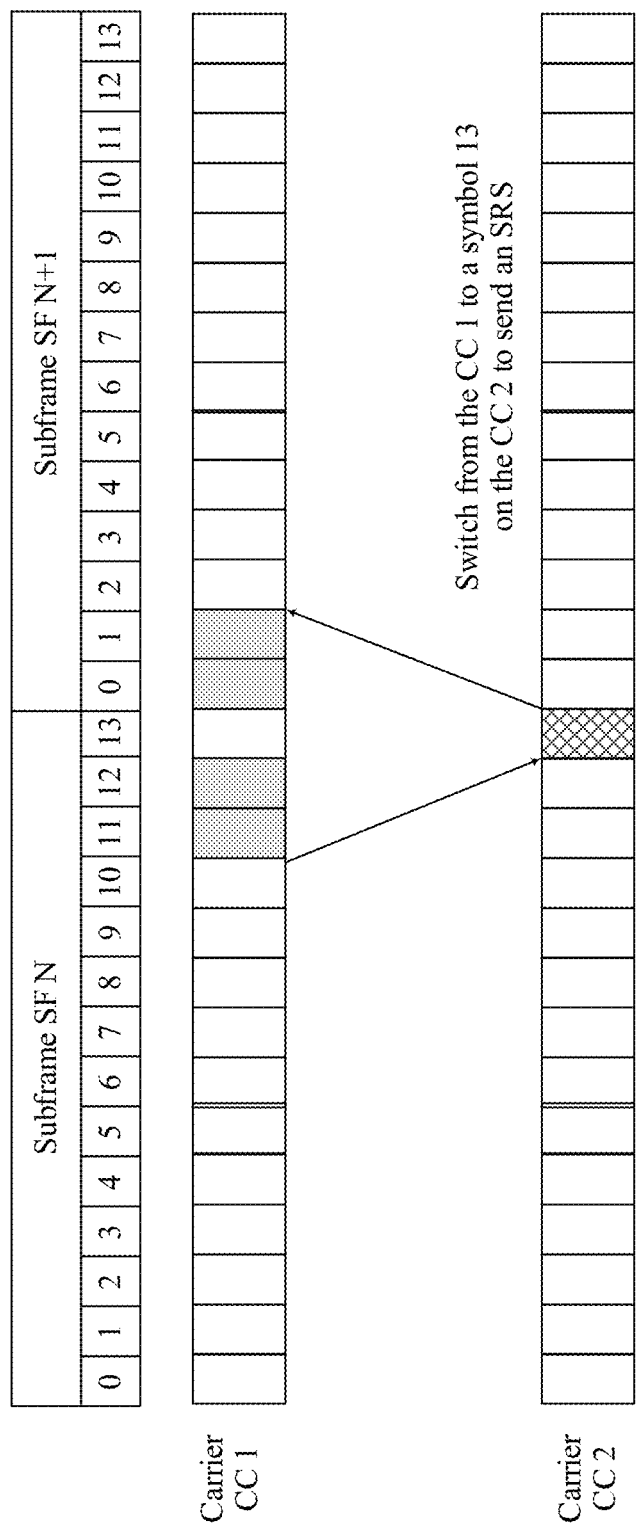
FIG. 2 is a schematic diagram showing that a terminal device switches from a CC 1 to a CC 2 to send an SRS according to an embodiment.

FIG. 2 is a schematic diagram showing that a terminal device switches from a CC 1 to a CC 2 to send an SRS. FIG. 2 shows two subframes (subframe, SF), namely, SF N and SF N+1, that correspond to the carriers CC 1 and CC 2. The CC 1 supports sending of uplink data, and the CC 2 supports sending of only downlink data. During SRS switching, the UE switches to RF (Radio Frequency, radio frequency) on a symbol 11 of the CC 1, and when the UE corresponds to a symbol 13, the RF is switched to the CC 2, to send an SRS, so that the base station can obtain downlink transmission channel information of the CC 2 based on the SRS. During SRS switching, the CC 1 is a switching source carrier (switching-from CC), or referred to as a normal CC (normal CC), and the CC 2 is a switching destination carrier (switching-to CC), or referred to as an SRS only CC.

The carriers in this embodiment include a carrier in a non-carrier aggregation (carrier aggregation, CA) scenario and a CC in a CA scenario. The CC in the CA scenario may be a primary CC or a secondary CC, and a serving cell in the CA scenario may be a primary serving cell (primary serving cell, PCell) or a secondary serving cell (secondary serving cell, Scell). For ease of description, in some scenarios of this embodiment, the carrier in the non-CA scenario and the CC in the CA scenario may be collectively referred to as a carrier. This is not specifically limited in this embodiment. In addition, a part that is of a carrier or a serving cell and that is used for uplink transmission may be understood as an uplink resource or an uplink carrier, and a part that is of the carrier or the serving cell and that is used for downlink transmission may be understood as a downlink resource or a downlink carrier. For example, in an FDD system, a frequency domain resource for uplink transmission on a carrier may be understood as an uplink resource or an uplink carrier, and a frequency domain resource for downlink transmission on the carrier may be understood as a downlink resource or a downlink carrier. Alternatively, for example, in a TDD system, a time domain resource for uplink transmission on a carrier may be understood as an uplink resource or an uplink carrier, and a time domain resource for downlink transmission on the carrier may be understood as a downlink resource or a downlink carrier.

In this embodiment, carrier-based SRS switching (SRS carrier based switching) in the carrier aggregation scenario is supported, and bandwidth part (Bandwidth Part, BP)-based SRS switching (SRS BP-based switching) may be further supported on a wideband carrier (wideband CC).

Figure 3:
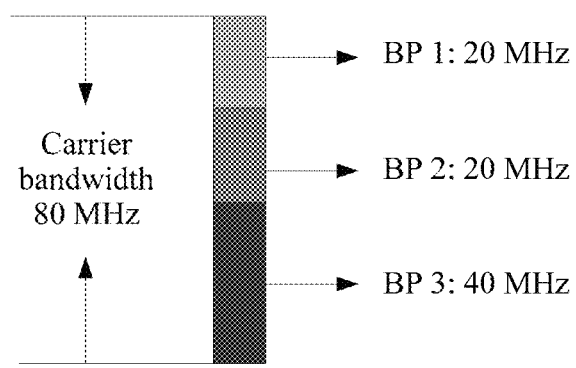
FIG. 3 is a schematic diagram of a relationship between a carrier and a bandwidth part according to an embodiment.

In this embodiment, the BP is a segment of frequency domain resource on a carrier or may be a bandwidth unit smaller than the carrier, and a carrier bandwidth may be further divided into a plurality of bandwidth parts. As shown in FIG. 3, a carrier bandwidth of 80 MHz may be divided into a BP 1 of 20 MHz, a BP 2 of 20 MHz, and a BP 3 of 40 MHz.

The BP may also be referred to as an operating bandwidth allocated by a network device to the UE. The operating bandwidth includes an uplink operating bandwidth and a downlink operating bandwidth. The uplink operating bandwidth is an uplink BP activated by the terminal device, and the downlink operating bandwidth is a downlink BP activated by the terminal device. In this embodiment, the operating bandwidth and a carrier bandwidth of the UE are decoupled. The carrier bandwidth is a quantity of resource blocks (resource block, RB) included in the wideband CC. The RB may have different subcarrier spacings (subcarrier spacing, SCS). In LTE, a CC of 20 M includes 100 RBs with a subcarrier spacing of 15 kHz. For a same type of subcarrier spacing, different UEs support different operating bandwidths, in other words, can process different quantities of RBs. Not all UEs need to support the carrier bandwidth. To be specific, the carrier bandwidth (for example, 100 M) may be greater than the operating bandwidth of the UE. Therefore, the network device allocates an operating bandwidth falling within a capability range of the UE to the UE, and the UE performs control and data transmission within the operating bandwidth (namely, the BP) allocated by the base station.

Figure 4:
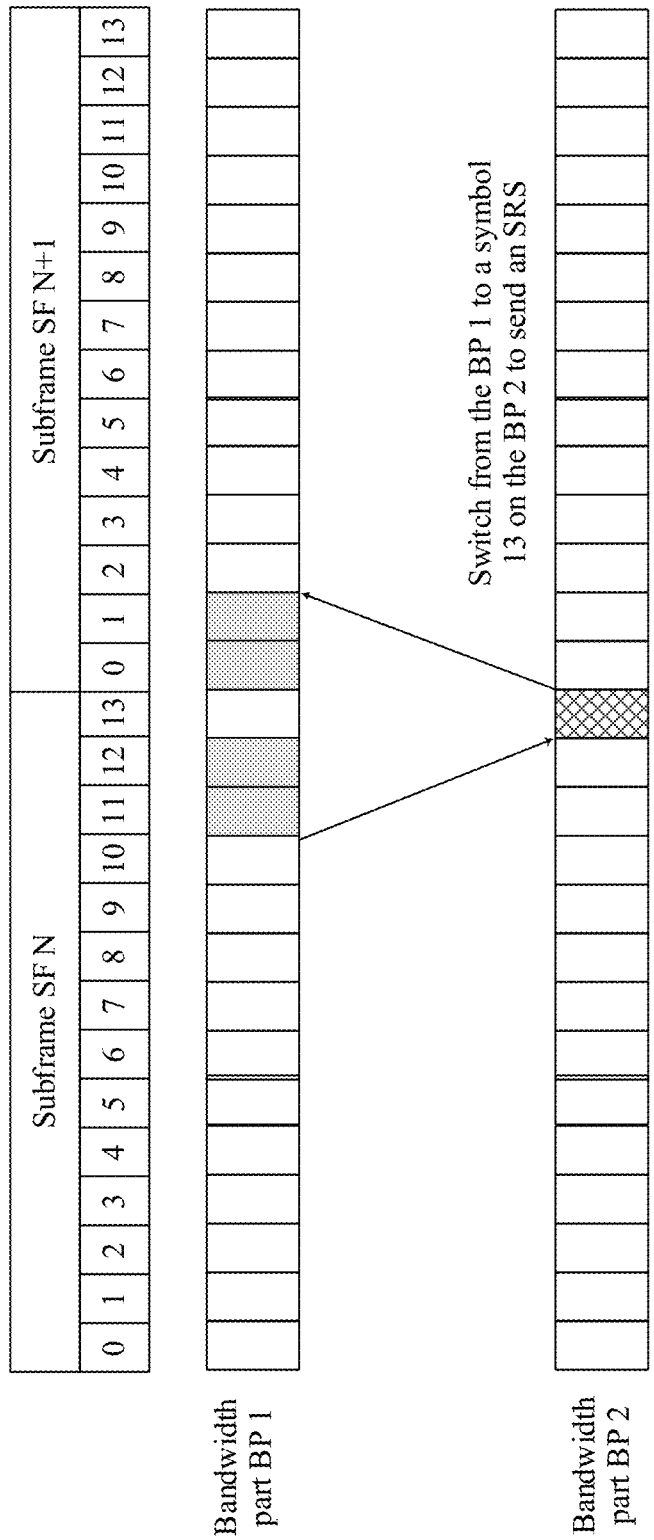
FIG. 4 is a schematic diagram showing that a terminal device switches from a BP 1 to a BP 2 to send an SRS according to an embodiment.

As shown in FIG. 4, during BP-based SRS switching, UE switches from a BP 1 to a BP 2, and sends an SRS on a symbol 13 of a subframe SF N, so that a base station can obtain downlink transmission channel information of the BP 2 based on the SRS. During SRS switching, the BP 1 is a switching source bandwidth part (switching-from BP), or referred to as a normal BP (normal BP), and the BP 2 is a switching destination carrier (switching-to BP), or referred to as an SRS only BP.

In the prior art, a unit for an SRS resource configuration is one OFDM symbol (which may be referred to as a symbol for short), and usually an SRS is sent on the last OFDM symbol of a subframe. Because a quantity and locations of transmission symbols of the SRS are fixed, a channel measurement requirement of a terminal device during highband transmission cannot be met. For example, when an uplink carrier of the terminal device is 1.8 GHz, transmitting an SRS by using one OFDM symbol can meet a channel measurement requirement of the terminal device. However, when the uplink carrier of the terminal device is 3.5 GHz, for a reason of a frequency band, a path loss increases when there is a same transmission distance, and transmitting an SRS by using one OFDM symbol cannot meet the channel measurement requirement of the terminal device.

In this embodiment, an SRS resource configuration supports a plurality of SRS symbols. To be specific, a network device may configure a plurality of OFDM symbols for a carrier or a BP to transmit an SRS. In an SRS switching scenario, SRS configuration information configured by the network device for the terminal device includes an OFDM symbol set (which may also be referred to as an SRS candidate set), the OFDM symbol set includes one or more OFDM symbols, and the terminal device may send an SRS on a configured transmission resource by using all or some of the OFDM symbols. It should be noted that, the SRS switching scenario in this embodiment includes a carrier-based SRS switching scenario and a bandwidth part-based SRS switching scenario. The following provides detailed descriptions with reference to FIG. 5.

It should be noted that, the network device in accordance with the disclosure may be a device that communicates with a wireless terminal through one or more sectors in an air interface in an access network. The network device may be a base station, or may be a network device or a network-side node that has a similar function as a base station. For example, the network device may be a control node connected to a base station, or any network-side device that has a resource configuration function, a resource scheduling function, or a resource reuse decision function.

501. A network device sends SRS configuration information of a first transmission resource and SRS configuration information of a second transmission resource to a terminal device.

In some embodiments, the network device may send the SRS configuration information to the terminal device through broadcasting, or may send the SRS configuration information to the terminal device by using RRC signaling, so that the terminal device can obtain the SRS configuration information of the first transmission resource and the SRS configuration information of the second transmission resource that are sent by the network device.

The first transmission resource supports transmission of at least one of a physical uplink control channel (physical uplink control channel, PUCCH), a physical uplink shared channel (physical uplink share channel, PUSCH), a physical random access channel (physical random access channel, PRACH), or an SRS signal. The first transmission resource may be a first carrier, or may be a first bandwidth part. The first carrier is a switching source carrier (switching-from CC) in a carrier-based SRS switching scenario. The first bandwidth part is a switching source bandwidth part (switching-from BP) in a BP-based SRS switching scenario. The first transmission resource in this embodiment may also be referred to as a first uplink transmission resource.

The second transmission resource does not support a PUCCH or a PUSCH. The second transmission resource may be a second carrier, or may be a second bandwidth part. The second carrier is a switching destination carrier (switching-to CC) in a carrier-based SRS switching scenario. The second bandwidth part is a switching destination bandwidth part (switching-to BP) in a BP-based SRS switching scenario. The second transmission resource in this embodiment may also be referred to as a second uplink transmission resource.

The SRS configuration information on the first transmission resource includes a first OFDM symbol set. The first OFDM symbol set includes one or more OFDM symbols. All or some OFDM symbols in the first OFDM symbol set are used by the terminal device to send an SRS on the first transmission resource. In other words, symbols in the first OFDM symbol set are symbols that can be used by the terminal device to send an SRS on the first transmission resource. In other words, a time domain resource used by the terminal device to send an SRS on the first transmission resource is a subset of the first OFDM symbol set. The first OFDM symbol set may also be referred to as a first SRS candidate set.

Figure 6:
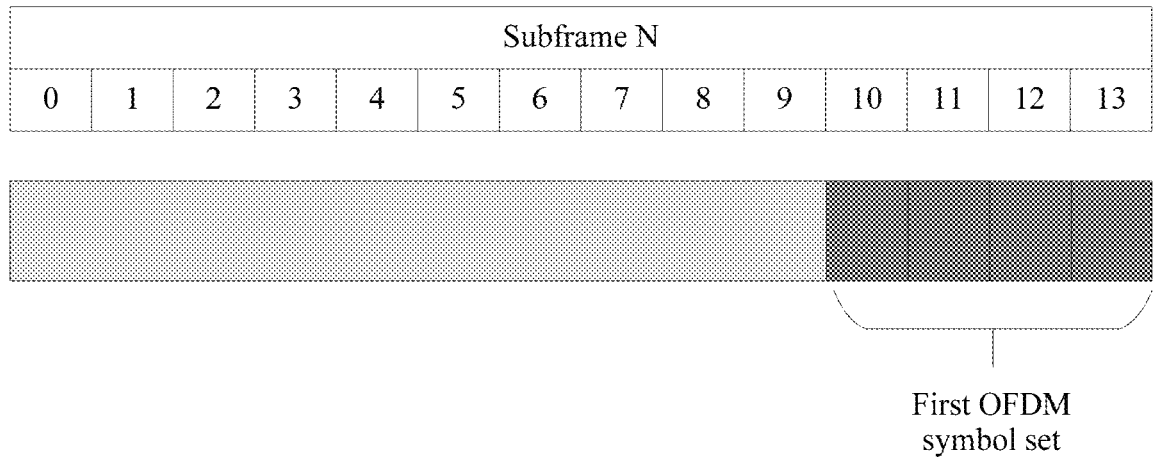
FIG. 6 is a schematic diagram of a first OFDM symbol set according to an embodiment.

The OFDM symbol may be defined as an OFDM symbol in a subframe, or may also be defined as an OFDM symbol in a slot, or may further be defined as an OFDM symbol in a time unit or a time interval. For example, as shown in FIG. 6, the first OFDM symbol set of the first transmission resource includes the last four symbols {10, 11, 12, 13} of a subframe. The terminal device may send an SRS on the first transmission resource by using one or more of {10, 11, 12, 13} in FIG. 6.

The SRS configuration information on the second transmission resource includes a second OFDM symbol set. The second OFDM symbol set includes one or more OFDM symbols. All or some OFDM symbols in the second OFDM symbol set are used by the terminal device to send an SRS on the second transmission resource. In other words, symbols in the second OFDM symbol set are symbols that can be used by the terminal device to send an SRS on the second transmission resource. In other words, a time domain resource used by the terminal device to send an SRS on the second transmission resource is a subset of the second OFDM symbol set. The second OFDM symbol set may also be referred to as a second SRS candidate set.

Figure 7:
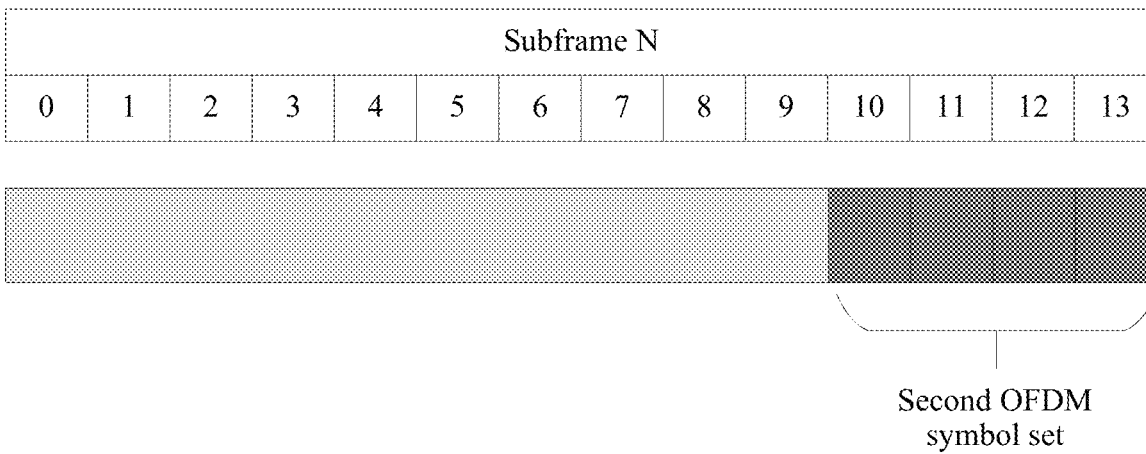
FIG. 7 is a schematic diagram of a second OFDM symbol set according to an embodiment.

The OFDM symbol may be an OFDM symbol in a subframe (subframe), or may also be an OFDM symbol in a slot (slot). For example, as shown in FIG. 7, the second OFDM symbol set of the second transmission resource includes the last four symbols {10, 11, 12, 13} of a subframe. The terminal device may send an SRS on the second transmission resource by using one or more of {10, 11, 12, 13} in FIG. 7.

It should be noted that, the first OFDM symbol set shown in FIG. 6 and the second OFDM symbol set shown in FIG. 7 are merely examples, and do not constitute any limitation on this application. In this embodiment, the first OFDM symbol set and the second OFDM symbol set may be the same or may be different.

It should be noted that, the terminal device may send the SRS configuration information of the first transmission resource and the SRS configuration information of the second transmission resource together or separately. This is not limited in this embodiment.

In some embodiments, before performing step 501, the network device may first generate the SRS configuration information of the first transmission resource and the SRS configuration information of the second transmission resource. In some embodiments, OFDM symbols that can be used to transmit an SRS may be preset in a protocol. That is, an OFDM symbol set for transmitting an SRS may be preset in a protocol. Subsequently, the network device selects one or more symbols from the OFDM symbol set preset in the protocol as the first OFDM symbol set, to specify an OFDM symbol set that can be used to transmit an SRS on the first transmission resource. Similarly, the network device selects one or more symbols from the OFDM symbol set preset in the protocol as the second OFDM symbol set, to specify an OFDM symbol set that can be used to transmit an SRS on the second transmission resource.

It is described in step 501 that the network device sends the first OFDM symbol set and the second OFDM symbol set to the terminal device. In this embodiment, the first OFDM symbol set and the second OFDM symbol set are not necessarily configured by the network device, but may be alternatively implemented through predefining by using a protocol. For example, the SRS configuration information of the first transmission resource and the SRS configuration information of the second transmission resource are predefined by using a protocol, to be specific, a first OFDM symbol set of a first carrier (or a first bandwidth part) and a second OFDM symbol set of a second carrier (or a second bandwidth part) are predefined by using a protocol, so that the terminal device can obtain the first OFDM symbol set and the second symbol OFDM symbol set from the SRS configuration information predefined in the protocol.

502. The terminal device sends an SRS on the first transmission resource based on the SRS configuration information of the first transmission resource, and sends an SRS on the second transmission resource based on the SRS configuration information of the second transmission resource.

After obtaining the SRS configuration information of the first transmission resource and the SRS configuration information of the second transmission resource, the terminal device sends an SRS on the first transmission resource based on the SRS configuration information of the first transmission resource, and sends an SRS on the second transmission resource based on the SRS configuration information of the second transmission resource. To be specific, when sending an SRS on the first transmission resource, the terminal device sends the SRS by using all or some OFDM symbols in the first OFDM symbol set, and when sending an SRS on the second transmission resource, the terminal device sends the SRS by using all or some OFDM symbols in the second OFDM symbol set.

It should be noted that, the SRS configuration information is used to limit an OFDM symbol set that can be used by the terminal device to send an SRS, but is neither a trigger condition for the terminal device to send an SRS nor an OFDM symbol occupied for actual sending of the SRS. The network device needs to configure, by using other signaling or indication information, some symbols that are in the OFDM symbol set and on which the terminal device sends an SRS, a type of the SRS to be sent, and information such as another resource configuration required for sending the SRS. For example, the network device performs the configuration by using RRC signaling or a DCI indication.

In this embodiment, in an SRS switching scenario, the SRS configuration information configured by the network device for the terminal device includes an OFDM symbol set, the OFDM symbol set includes one or more OFDM symbols, and these OFDM symbols may be used to transmit an SRS. Therefore, a channel may be measured on a carrier or a bandwidth part by using a plurality of SRSs, so that high-frequency channel measurement can be better supported, thereby improving channel measurement efficiency.

In this embodiment, during SRS switching, switching from a CC to another CC or switching from a BP to another BP is performed. Therefore, RF needs to be retuned (RF retuning). For example, for carrier-based SRS switching, within an RF retuning time, if a switching source carrier (switching-from CC) is an FDD carrier, UE cannot perform uplink transmission within the RF retuning time; or if a switching source carrier (switching-from CC) is a TDD carrier, UE cannot perform uplink transmission and/or downlink receiving within the RF retuning time. Therefore, during SRS switching, the switching source carrier or a switching source BP is affected.

As shown in FIG. 2, the UE switches from the CC 1 to the CC 2, and sends an SRS on a symbol 13 of a subframe N of the CC 2. After switching from the CC 1 to the CC 2 and transmitting an SRS on a symbol, the UE needs to switch from the CC 2 to the CC 1 to continue uplink transmission. To be specific, SRS transmission on a symbol of the CC 2 needs RF retuning twice, and each time of RF retuning needs two OFDM symbols. Therefore, when the UE sends an SRS on the CC 2, the UE cannot send a PUSCH on symbols 11 to 13 of the subframe N of the CC 1 and symbols 0 and 1 of the subframe N+1.

Figure 8:
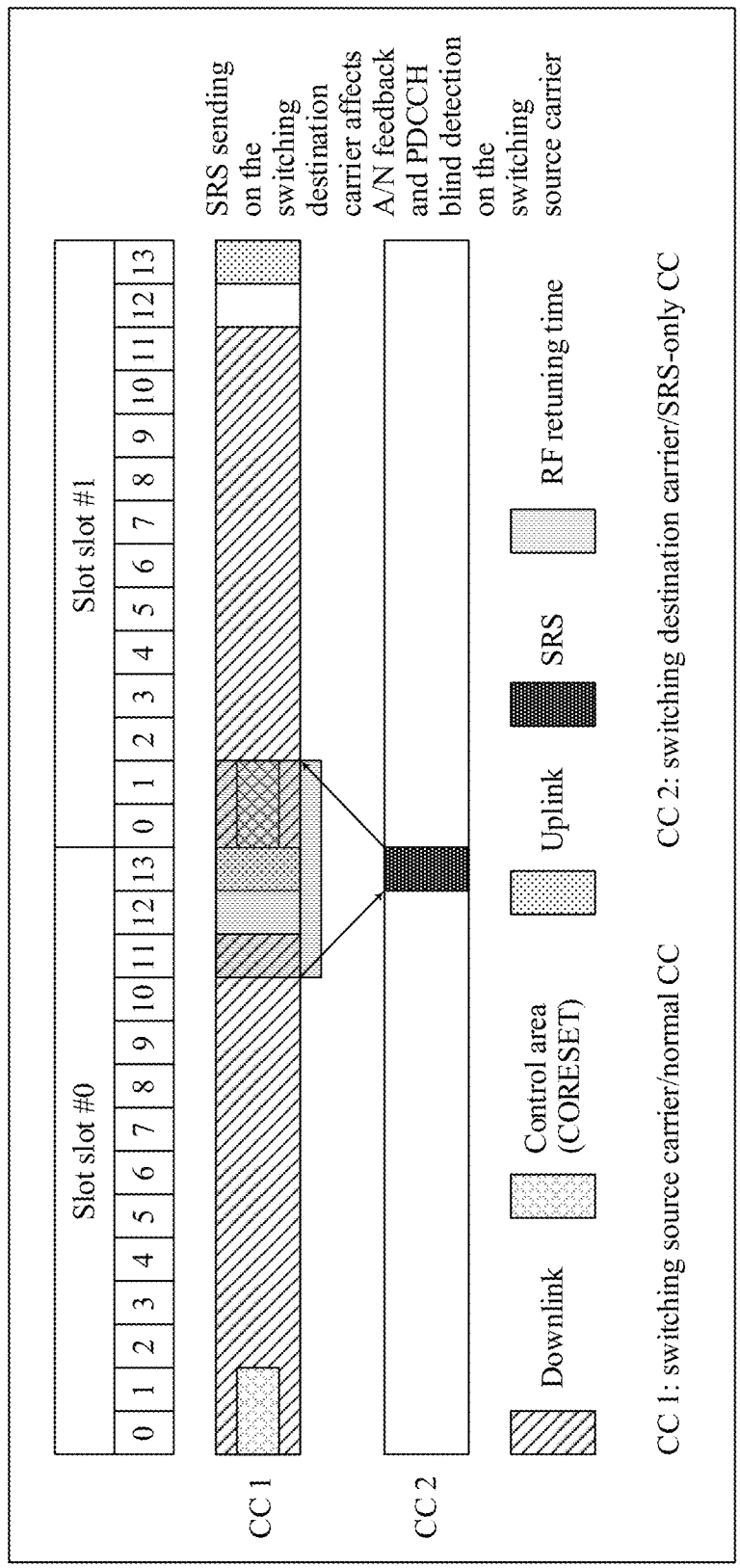
FIG. 8 is a schematic diagram of RF retuning in an SRS switching process according to an embodiment.

As shown in FIG. 8, the UE has both uplink and downlink transmission on the CC 1, and the symbols 0 to 11 are downlink transmission resources. A part of a frequency band in which the symbols 0 and 1 are located is a control area. The symbol 12 is a blank symbol, or referred to as a gap (gap). The symbol 13 is an uplink transmission resource. On the CC 2, for the UE, a symbol 13 of a slot slot #0 is a symbol for sending an SRS, and the other symbols are all downlink transmission resources. The UE switches from the CC 1 to the CC 2, and sends an SRS on a symbol 13 of a slot of the CC 2. SRS transmission on the CC 2 affects symbols 11 to 13 of the slot #0 and symbols 0 and 1 of a slot #1 of the CC 1. Therefore, feedback of an ACK/a NACK of downlink data in a PUCCH of the symbol 13 of the slot #0 is affected, and blind detection of a PDCCH in the slot #1 is also affected.

FIG. 2 and FIG. 8 describe impact of SRS switching on a switching source carrier by using the carrier-based SRS switching as an example. For the bandwidth part-based SRS switching, a same problem exists. Details are not described herein.

FIG. 2 and FIG. 8 show SRS switching on one symbol. During SRS switching and RF retuning on one symbol, five symbols on the CC 1 are affected. In this embodiment, SRS resource configurations of a plurality of symbols are supported, and RF retuning of SRS switching of each symbol affects a corresponding symbol on the CC 1. Therefore, during SRS switching, various channels on the switching source carrier are greatly affected.

Figure 5:
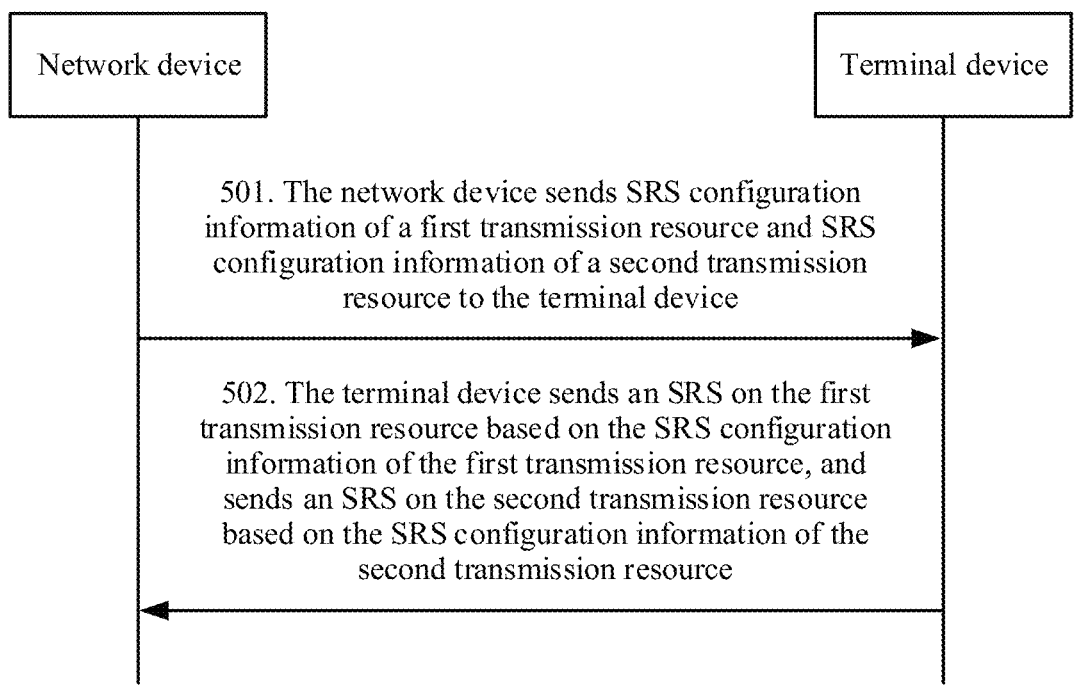
FIG. 5 is a schematic diagram of information exchange between a network device and a terminal device according to an embodiment.

Therefore, based on the embodiment shown in FIG. 5, embodiments in accordance with the disclosure can provide a communication method, so as to reduce impact on a channel on the switching source carrier during SRS switching.

In this embodiment, the OFDM symbol set in the SRS configuration information, namely, the SRS candidate set is related to a carrier type or a BP type, and the first OFDM symbol set and the second OFDM symbol set that are configured by the network device are different. The carrier type indicates whether the carrier is a switching source carrier or a switching destination carrier during SRS switching. The BP type indicates whether the BP is a switching source BP or a switching destination BP during SRS switching. For example, an SRS candidate set on the switching destination carrier or BP may be symbols 7 to 13 of a slot, and an SRS candidate set on the switching source carrier or BP may be symbols 10 to 13 of a slot.

In this embodiment, that the first OFDM symbol set and the second OFDM symbol set are different may be that the first OFDM symbol set and the second OFDM symbol set are partially dif. That the first OFDM symbol set and the second OFDM symbol set are different may be specifically that quantities of OFDM symbols are different, or may be locations of OFDM symbols are different, or both quantities and locations of OFDM symbols are different.

Figure 9:
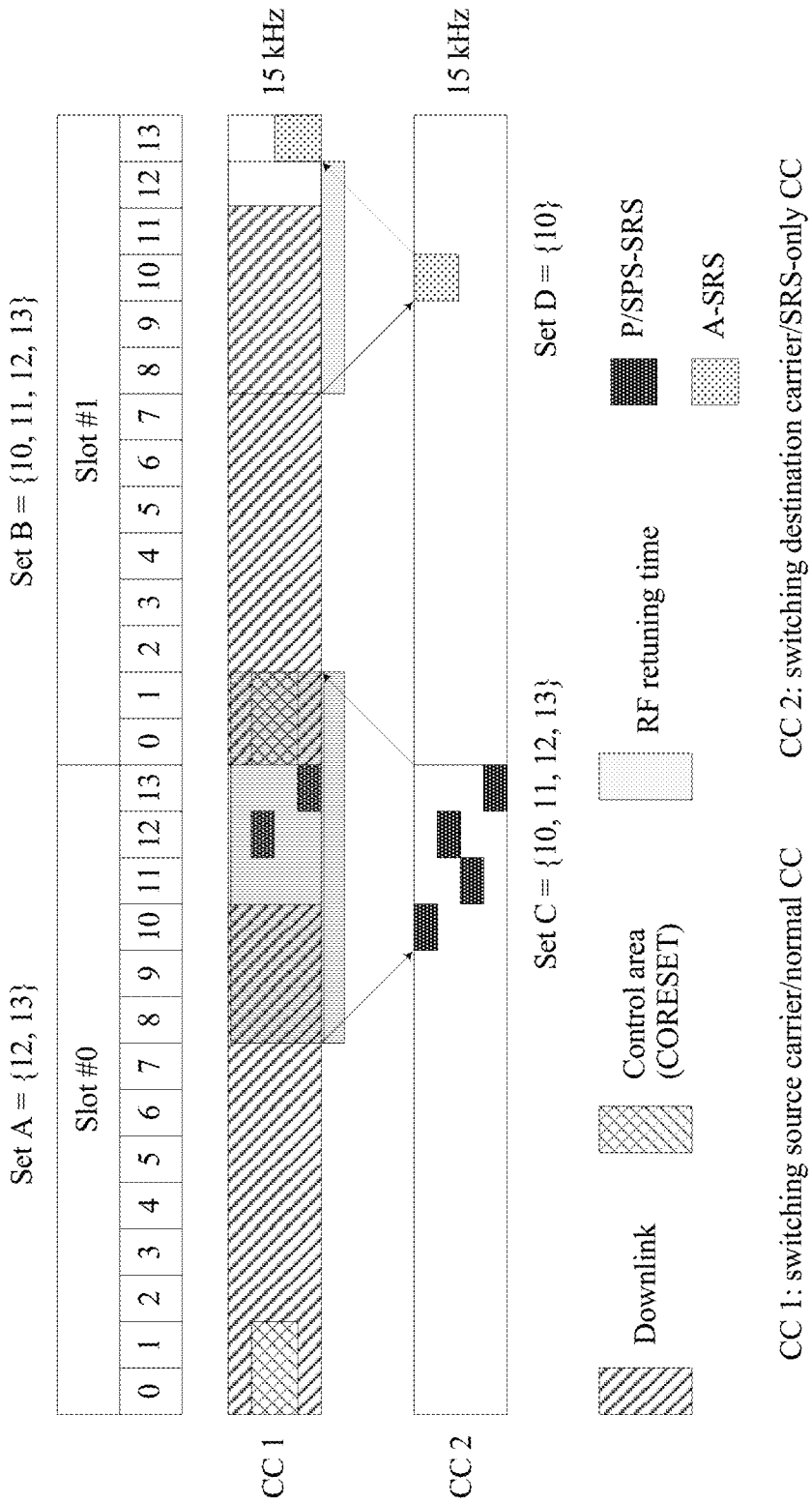
FIG. 9 is a schematic configuration diagram of an SRS candidate set in an SRS switching scenario according to an embodiment.

The following provides a description by using a carrier-based SRS switching scenario as an example. For a BP-based SRS switching scenario, refer to the carrier-based SRS switching scenario. For UE in carrier aggregation, two carriers CC 1 and CC 2 shown in FIG. 9 are configured, and are limited by an uplink capability of the UE. The CC 1 is a normal CC (switching-from CC), and the CC 2 is an SRS only CC (switching-to CC). To reduce impact of an RF retuning time required for SRS transmission on the SRS-only CC on a channel of the normal CC, locations and a quantity of SRS symbols are related to a CC type. As shown in FIG. 9, a set A on the normal CC and a set B on the SRS-only CC/BP are different, an SRS candidate set (namely, a first OFDM symbol set) of the UE on the normal CC is the set A={12, 13}, an SRS candidate set (a second OFDM symbol) of the UE on the SRS-only CC is the set B={10, 11, 12, 13}, and the set A and the set B are different.

In this embodiment, different SRS candidate sets are configured for the CC 1 (namely, the switching source carrier) and the CC 2 (namely, the switching destination carrier), so that a possibility that the UE transmits an SRS on the CC 1 and the CC 2 by using different locations and/or different quantities of symbols may increase. Therefore, on one hand, a probability that an SRS on the CC 1 falls within a range affected by the RF retuning can be reduced, thereby reducing a probability that the SRS on the CC 1 is affected. On the other hand, impact of the RF retuning on other received and sent channels on the CC 1 can be reduced.

In some embodiments, the locations and quantities of SRS symbols are related to SRS types. In the SRS candidate set, different types of SRSs have corresponding candidate sets.

In one embodiment, the first OFDM symbol set includes a first OFDM symbol subset and a second OFDM symbol subset. All or some OFDM symbols in the first OFDM symbol subset are used by the terminal device to send a periodic SRS or a semi-persistent SRS on the first transmission resource. In other words, a time domain resource used by the terminal device to send a periodic SRS and a semi-persistent SRS on the first transmission resource is a subset of the first OFDM symbol subset. All or some OFDM symbols in the second OFDM symbol subset are used by the terminal device to send an aperiodic SRS on the first transmission resource. In other words, a time domain resource used by the terminal device to send an aperiodic SRS on the first transmission resource is a subset of the first OFDM symbol subset. The first OFDM symbol subset and the second OFDM symbol subset are different. The first OFDM symbol subset may also be referred to as a first P/SPS-SRS candidate set, and the second OFDM symbol subset may also be referred to as a first A-SRS candidate set.

It should be noted that, that the first OFDM symbol subset and the second OFDM symbol subset are different may be that the first OFDM symbol subset and the second OFDM symbol subset are partially different, or the first OFDM symbol subset and the second OFDM symbol subset are totally different. That the first OFDM symbol subset and the second OFDM symbol subset are different may be specifically that quantities of OFDM symbols are different, or may be locations of OFDM symbols are different, or both quantities and locations of OFDM symbols are different.

It should be noted that, that the first OFDM symbol subset and the second OFDM symbol subset are different is unrelated to whether the first OFDM symbol set and the second OFDM symbol set in the SRS configuration information are the same. The first OFDM symbol subset and the second OFDM symbol subset may be different in a condition in which the first OFDM symbol set and the second OFDM symbol set are the same, or the first OFDM symbol subset and the second OFDM symbol subset may be different in a condition in which the first OFDM symbol set and the second OFDM symbol set are different.

In one embodiment, the second OFDM symbol set includes a third OFDM symbol subset and a fourth OFDM symbol subset. All or some OFDM symbols in the third OFDM symbol subset are used by the terminal device to send a periodic SRS or a semi-persistent SRS on the second transmission resource. In other words, a time domain resource used by the terminal device to send a periodic SRS and a semi-persistent SRS on the second transmission resource is a subset of the third OFDM symbol subset. All or some OFDM symbols in the fourth OFDM symbol subset are used by the terminal device to send an aperiodic SRS on the second transmission resource. In other words, a time domain resource used by the terminal device to send an aperiodic SRS on the second transmission resource is a subset of the fourth OFDM symbol subset. The third OFDM symbol subset and the fourth OFDM symbol subset are different. The third OFDM symbol subset may also be referred to as a second P/SPS-SRS candidate set, and the second OFDM symbol subset may also be referred to as a second A-SRS candidate set.

For example, if the A-SRS candidate set corresponding to the switching destination carrier is symbols 7 to 9 of the slot, all or some of the symbols 7 to 9 may be used by the terminal device to send an A-SRS on the destination carrier. In other words, locations and a quantity of symbols for sending the A-SRS on the switching destination carrier may be a subset of the symbols 7 to 9 of the slot. On the switching destination carrier, all or some of symbols 10 to 13 of the slot may be used by the terminal device to send a P-SRS and/or an SPS-SRS on the destination carrier. In other words, locations and a quantity of symbols for sending the P-SRS and/or the SPS-SRS on the switching destination carrier may be a subset of the symbols 10 to 13 of the slot.

Locations and a quantity of SRS symbols on the CC 2 shown in FIG. 9 are a subset of the set B. This further alleviates impact of transmission of different types of SRSs on the CC 2 on the CC 1. Locations and a quantity of symbols for transmitting a P/SPS-SRS (P-SRS and/or SPS-SRS) on the switching target carrier are a subset of a set C={10, 11, 12, 13}. In other words, all or some symbols in the set C are used by the terminal device to send a P/SPS-SRS on the CC 2. Locations and a quantity of symbols for transmitting an A-SRS on the SRS-only CC are a subset of a set D={10}. In other words, all or some symbols in the set D are used by the terminal device to send an A-SRS on the CC 2. Both the set C and the set D are subsets of the set B of the locations and the quantity of SRS symbols on the SRS-only CC. The set C and the set D are different.

It should be noted that, that the third OFDM symbol subset and the fourth OFDM symbol subset are different may be that the third OFDM symbol subset and the fourth OFDM symbol subset are partially different, or the third OFDM symbol subset and the fourth OFDM symbol subset are totally different. That the third OFDM symbol subset and the fourth OFDM symbol subset are different may be that quantities of OFDM symbols are different, or may be locations of OFDM symbols are different, or both quantities and locations of OFDM symbols are different.

It should be noted that, that the third OFDM symbol subset and the fourth OFDM symbol subset are different is unrelated to whether the first OFDM symbol set and the second OFDM symbol set in the SRS configuration information are the same. The third OFDM symbol subset and the fourth OFDM symbol subset may be different in a condition in which the first OFDM symbol set and the second OFDM symbol set are the same, or the third OFDM symbol subset and the fourth OFDM symbol subset may be different in a condition in which the first OFDM symbol set and the second OFDM symbol set are different.

In this embodiment, different OFDM symbol subsets may be configured for different types of SRSs. The A-SRS is usually used to obtain a channel condition on a segment of frequency domain in which a network side is interested, and is usually a narrowband SRS. Therefore, a small candidate set may be set to transmit the A-SRS. The P/SPS-SRS is usually used to obtain channel conditions of all channels on an entire system bandwidth. Therefore, a large candidate set may be set to transmit the P/SPS-SRS. In this way, corresponding SRS transmission symbols may be configured based on features of different types of SRSs, thereby reducing impact of a channel on the switching source carrier.

In this embodiment, the first OFDM symbol subset, the second OFDM symbol subset, the third OFDM symbol subset, and the fourth OFDM symbol subset are not necessarily configured by the network device, but may be alternatively implemented through predefining by using a protocol. For example, the first OFDM symbol subset and the second OFDM symbol subset are predefined by using a protocol. In other words, a symbol set that can be used to send a P/SPS-SRS on the first carrier (or the first bandwidth part) and a symbol set that can be used to send an A-SRS on the first carrier (or the first bandwidth part) are predefined by using a protocol. In addition, the third OFDM symbol subset and the fourth OFDM symbol subset are predefined by using a protocol. In other words, a symbol set that can be used to send a P/SPS-SRS on the second carrier (or the second bandwidth part) and a symbol set that can be used to send an A-SRS on the second carrier (or the second bandwidth part)

are predefined by using a protocol. In this way, the terminal device can obtain the first OFDM symbol subset, the second OFDM symbol subset, the third OFDM symbol subset, and the fourth OFDM symbol subset from the SRS configuration information predefined by using the protocol. In addition, the first OFDM symbol subset and the second OFDM symbol subset are different, and the third OFDM symbol subset and the fourth OFDM symbol subset are different.

In some embodiments, a quantity of OFDM symbols in the third OFDM symbol subset is greater than a quantity of OFDM symbols in the first OFDM symbol subset. A quantity of OFDM symbols that can be used by the terminal device to send a periodic SRS and a semi-persistent SRS on the second transmission resource may be greater than a quantity of OFDM symbols that can be used by the terminal device to send a periodic SRS and a semi-persistent SRS on the first transmission resource. Alternatively, a quantity of OFDM symbols that can be used by the terminal device to send a periodic SRS on the second transmission resource may be greater than a quantity of OFDM symbols that can be used by the terminal device to send a periodic SRS on the first transmission resource. Alternatively, a quantity of OFDM symbols that can be used by the terminal device to send a semi-persistent SRS on the second transmission resource may be greater than a quantity of OFDM symbols that can be used by the terminal device to send a semi-persistent SRS on the first transmission resource.

As shown in FIG. 9, a quantity of symbols included in a P/SPS-SRS on the CC 2 is greater than a quantity of symbols included in a P/SPS-SRS on the CC 1. Locations and a quantity of symbols for the P/SPS-SRS on the CC 2 in the slot #0 are the symbol 10 to the symbol 13. Locations and a quantity of symbols for the P/SPS-SRS on the CC 1 in the slot #0 are the symbol 12 and the symbol 13. Because the SRS transmission on the CC 2 needs RF retuning, the UE expects that overheads of the RF retuning are as small as possible, in other words, a transmission period of the P/SPS-SRS is as long as possible, and there are as more opportunities as possible to transmit an SRS. Therefore, the locations and the quantity of symbols for the P/SPS-SRS on the CC 2 can make the SRS period longer but a quantity of symbols transmitted each time larger, while ensuring accuracy of an obtained channel state. However, for the CC 1, the SRS transmission on the CC 1 does not need RF retuning. To reduce impact of an SRS transmission conflict on the CC 2, relatively high transmission density of the P/SPS-SRS on the CC 1 should be configured. In other words, a transmission period of the P/SPS-SRS is as short as possible, but only an SRS using a smaller quantity of symbols is transmitted each time. Otherwise, after a conflict occurs, a relatively large quantity of symbols for the SRS on the CC 1 are discarded.

In this embodiment, a quantity of OFDM symbols that can be used by the terminal device to send a periodic SRS and/or a semi-persistent SRS on the switching destination carrier (or the switching destination BP) is greater than a quantity of OFDM symbols that can be used by the terminal device to send a periodic SRS and/or a semi-persistent SRS on the switching source carrier (or the switching source BP), so that impact of a conflict on SRS transmission on the switching source carrier can be reduced.

In this embodiment, a quantity of OFDM symbols in the third OFDM symbol subset may be less than a quantity of OFDM symbols in the fourth OFDM symbol subset. In other words, on the second transmission resource, a quantity of symbols that can be used by the terminal device to send the aperiodic SRS is less than a quantity of symbols that can be used to send the periodic SRS and/or the semi-persistent SRS.

As shown in FIG. 9, a symbol included in the A-SRS on the CC 2 is the symbol 10, symbols included in the P/SPS-SRS on the CC 2 are the symbols 10 to 13, and a quantity of symbols that can be used to send the A-SRS on the CC 2 is less than a quantity of symbols that can be used to send the P/SPS-SRS on the CC 1. The A-SRS is usually used to obtain a channel condition on a segment of frequency domain in which a network side is interested, and is usually a narrowband SRS. Therefore, a small candidate set may be set to transmit the A-SRS. The P/SPS-SRS is usually used to obtain channel conditions of all channels on an entire system bandwidth. Therefore, a large candidate set may be set to transmit the P/SPS-SRS. DCI triggers transmission of the A-SRS on the CC 2 instead of the P/SPS-SRS on the CC 2. To reduce impact of RF retuning on the two slots of the CC 1 as much as possible, a quantity of symbols of the A-SRS on the CC 2 is less than or equal to a quantity of symbols of the P/SPS-SRS on the SRS-only CC.

In some embodiments, same as the principle that on the second transmission resource, a quantity of symbols that can be used by the terminal device to send the aperiodic SRS is less than a quantity of symbols that can be used to send the periodic SRS and/or the semi-persistent SRS, in this embodiment, a quantity of OFDM symbols in the first OFDM symbol subset may be less than a quantity of OFDM symbols in the second OFDM symbol subset. In other words, on the first transmission resource, a quantity of symbols that can be used by the terminal device to send the aperiodic SRS is less than a quantity of symbols that can be used to send the periodic SRS and/or the semi-persistent SRS.

It should be noted that, a manner of configuring the first OFDM symbol set, the second OFDM symbol set, the first OFDM symbol subset, the second OFDM symbol subset, the third OFDM symbol subset, and the fourth OFDM symbol subset in the SRS configuration information may be setting an attribute corresponding to each symbol. For example, for the normal CC, it is set or predefined that: the symbol 10 may be used to transmit an A-SRS; the symbol 11 may be used to transmit an A-SRS, and may be used to transmit a P-SRS, and may be used to transmit an SPS-SRS; the symbol 12 may be used to transmit a P-SRS, and may be used to transmit an SPS-SRS; and the symbol 13 may be used to transmit an SPS-SRS. In this way, the first OFDM symbol set of the first transmission resource includes the symbols 10 to 13, the first OFDM symbol subset includes the symbols 11 to 13, and the second OFDM symbol subset includes the symbols 10 and 11.

The foregoing describes content in the SRS configuration information or the predefined SRS information in this embodiment. After SRS configuration information is sent, an embodiment further provides a method for sending SRS indication information.

Based on the foregoing configuration, the UE obtains SRS configuration information on different carriers/BPs. That the UE sends an SRS on different carriers/BPs is sending the SRS on a corresponding resource based on the SRS configuration information and a configuration related to sending of the SRS. Different types of SRSs correspond to different configurations related to sending of the SRSs.

In some embodiments, a configuration related to sending of a P-SRS or an SPS-SRS may be configured by using RRC signaling, or may be predefined by using a protocol. This is not specifically limited herein. A specific symbol location that is in the SRS configuration information and at which a P-SRS and/or an SPS-SRS is to be sent may be specified in the configuration related to sending of the P-SRS or the SPS-SRS. For example, in the SRS configuration information of the switching destination carrier, a P-SRS candidate set is the symbol 12 and the symbol 13. In this case, it may be specified in the configuration related to sending of the P-SRS that the P-SRS is to be sent on the symbol 2 in the P-SRS candidate set. The UE sends a P-SRS (or an SPS-SRS) on a corresponding resource based on a P-SRS (or SPS-SRS) candidate set and a configuration related to RRC.

In some embodiments, on the switching source carrier or BP, a configuration related to sending of an A-SRS may be indicated by using DCI, and the DCI for sending an A-SRS may indicate a specific symbol location that is in the SRS configuration information and that is for sending the A-SRS. For example, in the SRS configuration information of the switching source carrier, the A-SRS candidate set is the symbol 10 and the symbol 11. In this case, it may be specified in the DCI for sending an A-SRS that the A-SRS is to be sent on the symbol 2 in the A-SRS candidate set. The UE sends an A-SRS on a corresponding resource based on an A-SRS candidate set on the carrier or the BP and the DCI indication for sending an A-SRS.

In some embodiments, in this embodiment, a method for sending SRS indication information is provided. A symbol location at which an A-SRS is to be sent is indicated in group DCI (group DCI). The method includes: sending, by the network device, group downlink control information group DCI to the terminal device, where the group DCI includes indication information used to indicate one or more terminal devices, the indication information includes SRS symbol location information of the terminal device, and the SRS symbol location information indicates an OFDM symbol location at which the terminal device sends the A-SRS on the switching destination carrier or the switching destination BP. The SRS symbol location information may be a location of the sent A-SRS in the second OFDM symbol set, or may be a location of the sent A-SRS in the fourth OFDM symbol subset. This is not limited herein.

For sending of the A-SRS on the switching destination carrier or BP, the UE obtains configuration information of the A-SRS on the carrier or BP, and the UE obtains specific transmission information of the SRS by using an RRC configuration message and the received group DCI. The group DCI includes the SRS symbol location information (SRS symbol location) of the terminal device. However, in addition to the SRS symbol location information, the group DCI may further include the following information: a transmit power control (transmit power control, TPC) command (TPC command) and an SRS triggering request (SRS request). The group DCI may be transmitted in a common PDCCH (common PDCCH), or may be transmitted in a group common PDCCH (group common PDCCH).

The group DCI in this embodiment means that a notification is sent to a terminal device (or user) group in the DCI format, and a dedicated radio network temporary identifier (radio network temporary identity, RNTI) is allocated to the terminal device group. The user obtains, by detecting DCI information scrambled based on the RNTI, a TPC command and an SRS triggering request when the user performs SRS switching, and SRS symbol location information during sending of the SRS.

A TPC command, an SRS triggering request, and SRS symbol location information of the terminal device on one or more switching destination carriers or switching target BPs may be carried in one or more blocks (block). The group DCI includes blocks of a plurality of users. Further, the blocks in the group DCI have the following features:

(1) Content included in the DCI includes one or more blocks.

(2) The blocks in the DCI are numbered from 1, in an order of a block number 1, a block number 2, . . . , and a block number B.

(3) Each block includes a TPC command field and an SRS triggering request command field, and the SRS triggering request is optional, and may be optionally carried or not carried based on a need.

The following describes, by using a carrier as an example, a case in detail in which the block carries indication information of group DCI. When SRS switching is BP-based SRS switching, the described content is also applicable. Details are not described herein again.

When less than or equal to N secondary carriers having neither a PUCCH nor a PUSCH and with a duplex mode being a TDD mode are configured for a user, each block includes a TPC command of a carrier, an SRS triggering request (which does not necessarily exist), and SRS symbol location information. A value of N may be predefined, or configured by using higher layer signaling. For example, comprehensively considering impact of signaling overheads and the like, the value of N may be set to 5. In this case, one block may be allocated to each carrier having neither a PUCCH nor a PUSCH of the terminal device for indication. Each block includes at least the following information:

an SRS triggering request (SRS request): occupying 0, 1, or 2 bits;

a TPC command number (TPC command number): occupying 1 or 2 bits; and

SRS symbol location information (SRS symbol location): occupying 2 bits or more, and this is not specifically limited herein.

When more than N secondary carriers having neither a PUCCH nor a PUSCH and with a duplex mode being a TDD mode are configured for a user, each block includes a TPC command of each carrier in a carrier set, an SRS triggering request (which does not necessarily exist) of the carrier set, and SRS symbol location information. A value of N may be predefined, or configured by using higher layer signaling. For example, comprehensively considering impact of signaling overheads and the like, the value of N may be set to 5. In this case, the carrier of the user may be divided into m subsets, one block is allocated to each subset for indication, and each block includes at least the following information:

an SRS triggering request (SRS request): occupying 0 or 2 bits;

a TPC command number 1, a TPC command number 2, . . . , and a TPC command number n: occupying 1 or 2 bits; and an SRS symbol location 1, an SRS symbol location 2, . . . , and an SRS symbol location n: occupying 2 bits, where n indicates n carriers in the subset, quantities of bits in the foregoing example are merely an example, other values may alternatively be defined, for example, the indication of the SRS symbol location information may be 2 bits or more, and this is not specifically limited herein.

Generally, one block may include a TPC command of one carrier or one carrier set, an SRS request (which may or may not exist), and SRS symbol location information.

Indication information corresponding to each terminal device may be indicated by one or more blocks. A specific quantity of required blocks is determined by a quantity of carriers of the terminal device. Specifically, when less than or equal to N secondary carriers having neither a PUCCH nor a PUSCH and with a duplex mode being TDD are configured for the terminal device, a quantity of required blocks is related to a quantity of the secondary carriers having neither the PUCCH nor the PUSCH and with the duplex mode being a TDD mode. When more than N secondary carriers having neither a PUCCH nor a PUSCH and with a duplex mode being a TDD mode are configured for the user, a quantity of required blocks is related to the carrier set, and the carrier set may be indicated by using higher layer signaling or an SRS triggering request command field.

A start block number of each terminal device in an entire DCI block sequence is configured by using higher layer signaling/RRC signaling. Therefore, each terminal device can obtain, based on a quantity of carriers of the terminal device and a start location configured by using the higher layer signaling/RRC signaling, a TPC command, an SRS triggering request (if existent), and SRS symbol location information of the terminal device on each carrier supported by the terminal device.

Figure 10:
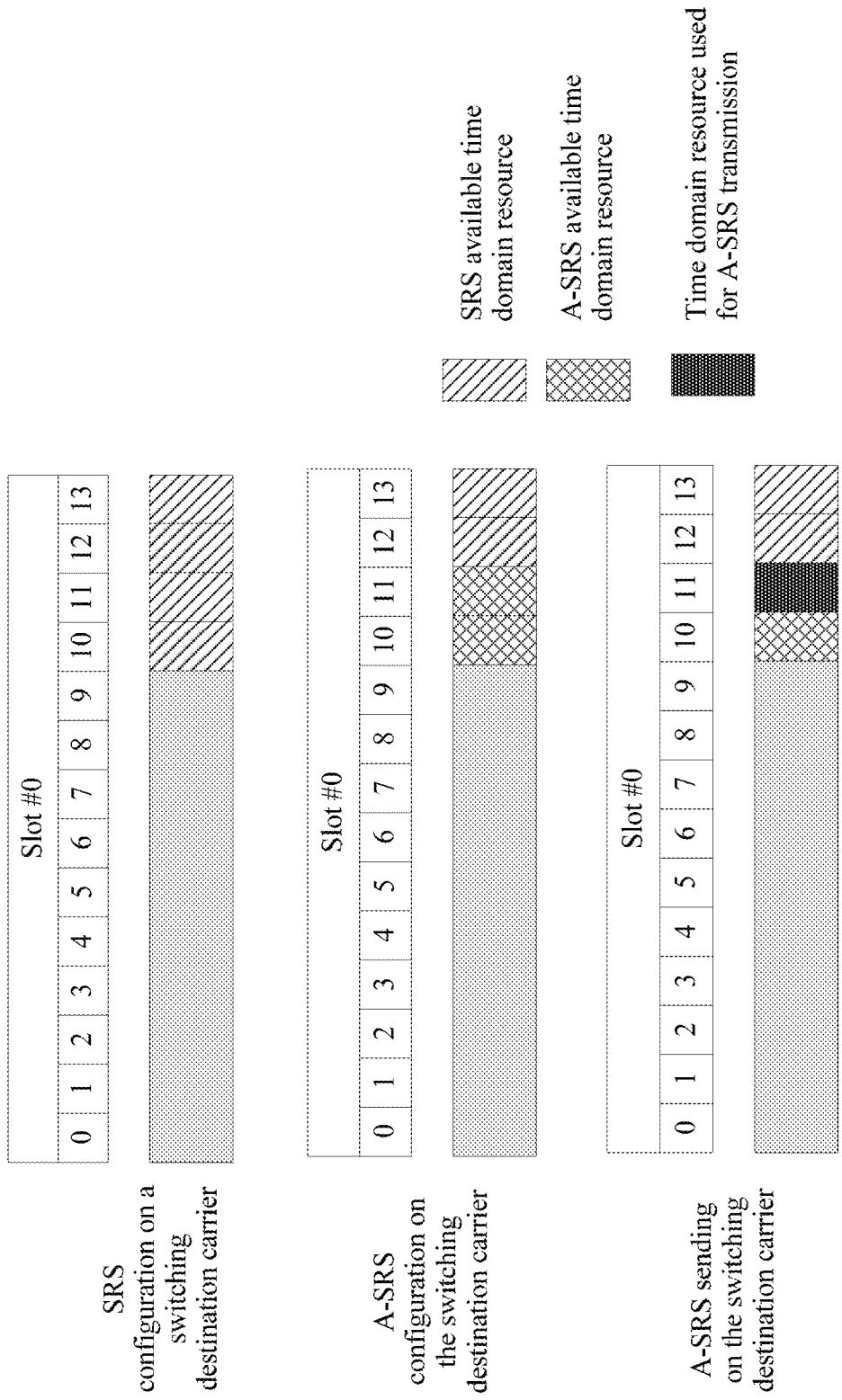
FIG. 10 is a schematic diagram of a transmission symbol of an A-SRS on a switching destination carrier according to an embodiment.

A possible example of A-SRS transmission on the switching destination carrier or BP is shown in FIG. 10. An SRS candidate set, namely, an SRS available time domain resource, in the SRS configuration information on the switching destination carrier is located on the last four symbols {10, 11, 12, 13} in the slot. It is assumed that an A-SRS candidate set, namely, an A-SRS available time domain resource is symbols {10, 11}.

In some embodiments, when SRS switching is performed, a quantity of A-SRS symbols on the carrier or BP may be indicated by using RRC signaling or DCI. Herein, it is assumed that a quantity of A-SRS symbols configured in the UE-specific RRC signaling is 1. A specific location of the A-SRS symbol is then indicated by using the group DCI. Optionally, when SRS switching is performed, alternatively, a quantity of A-SRS symbols on the carrier or BP may not be indicated, and only a specific location of the A-SRS symbol is indicated by using the group DCI.

It is assumed that the SRS symbol location information (SRS symbol location) in the group DCI is 1 bit, and the field is used to indicate specific locations that are of symbols on which the UE transmits the A-SRS and that are in a plurality of SRS transmission symbols in the A-SRS candidate set. A manner of indicating the specific location of the A-SRS symbol by using the group DCI may be indicated by using an example shown in Table 1.

TABLE 1

| 0 | 1 |
|---|---|
| A symbol 1 in an area in which the A-SRS of the UE can be transmitted | A symbol 2 in the area in which the A-SRS of the UE can be transmitted |

It is assumed that an indication of the SRS symbol location information (SRS symbol location) in the group DCI is 1. As shown in FIG. 10, a symbol 11 is a time domain resource used for A-SRS transmission, and the terminal device transmits the A-SRS on the symbol 11.

In each of the foregoing examples, indication is performed by using a carrier as a unit. In this embodiment, indication performed by using a smaller unit is also supported. For example, indication is performed by using a BP as a unit. For a method for performing indication by using a BP as a unit, refer to the method for performing indication by using a carrier as a unit.

In this embodiment, a symbol location of the A-SRS is indicated in the group DCI, so that a quantity and locations of symbols used by the terminal device to send the A-SRS can be flexibly configured, thereby meeting SRS transmission requirements in different scenarios.

In some embodiments, in another method for sending SRS indication information, an SRS precoding codebook may be indicated in the group DCI. The network device sends group DCI to the terminal device. The group DCI includes indication information used to indicate one or more terminal devices. The indication information includes precoding information or a codebook of the terminal device. The precoding information or the codebook is used to indicate precoding or a codebook used by the terminal device to send the aperiodic SRS on the second transmission resource (namely, the switching target carrier or the switching target BP). The group DCI may be transmitted in a common PDCCH or a group common PDCCH.

The following describes, by using a carrier as an example, a case in detail in which the indication information of the group DCI includes the precoding information or the codebook. When SRS switching is BP-based SRS switching, the described content is also applicable. Details are not described herein again.

This embodiment is similar to the foregoing embodiment in which the indication information of the group DCI includes the SRS symbol location information, and a difference from the foregoing embodiment is that: when A-SRS transmission on the switching target carrier is triggered, the group DCI includes precoding information (precoder) or a codebook (codebook) used for SRS transmission.

The group DCI in this embodiment includes at least the following information: a TPC command, an SRS request (which may not exist), and SRS precoder/codebook information. An example of the group DCI includes the following information: a block number 1, a block number 2, . . . , and a block number B. The group DCI includes indication information used to indicate one or more terminal devices, and start location indications of different terminal devices in the group DCI are configured by using higher layer signaling or RRC signaling. Based on different quantities of carriers configured for the terminal device, there may be the following two cases.

Case 1: If a quantity of carriers having neither a PUCCH nor a PUSCH and configured for the UE is greater than N, a value of N may be predefined, or configured by using higher layer signaling. In this case, a carrier of a user may be divided into m subsets, one block is allocated to each subset for indication, and each block includes at least the following information: an SRS request: occupying 0 or 2 bits; a TPC command number 1, a TPC command number 2, . . . , and a TPC command number n: occupying 1 or 2 bits; and an SRS codebook 1, an SRS codebook 2, . . . , and an SRS codebook n: occupying 2 bits. n indicates n carriers in the subset, quantities of bits in the foregoing example are merely an example, other values may alternatively be defined, for example, the indication of an SRS precoding codebook may be 2 bits or more, and this is not specifically limited herein.

Case 2: If a quantity of carriers having neither a PUCCH nor a PUSCH and configured for the UE is less than or equal to N, a value of N may be predefined, or configured by using higher layer signaling. In this case, one block may be allocated to each carrier having neither a PUCCH nor a PUSCH of the user for indication. Each block includes at least the following information: an SRS request: occupying 0, 1, or 2 bits; a TPC command number: occupying 1 or 2 bits; and an SRS codebook: occupying 2 bits. The indication of the SRS precoding codebook may be 2 bits or more. This is not specifically limited herein.

In each of the foregoing examples, indication is performed by using a carrier as a unit. In this embodiment, indication performed by using a smaller unit is also supported. For example, indication is performed by using a BP as a unit.

In addition, it should be noted that, the group DCI in this embodiment may include both the SRS symbol location information and the precoding information or the codebook. The SRS symbol location information and the precoding information/codebook may coexist, or only either of the SRS symbol location information and the precoding information/codebook may exist. For example, each block includes at least the following information: an SRS request, a TPC command number, an SRS symbol location, and an SRS codebook.

In this embodiment, during an SRS switching operation, the SRS precoding codebook is indicated, so that SRS transmission performance on a carrier having neither a PUCCH nor a PUSCH can be improved, thereby meeting transmission requirements in different scenarios.

In another embodiment, a beam index or a beam pair index on the switching target carrier may be indicated by using group DCI. The network device sends group DCI to the terminal device. The group DCI includes indication information used to indicate one or more terminal devices. The indication information includes beam index information of the terminal device. The beam index information is used to indicate a beam index or a beam pair index used by the terminal device to send the aperiodic SRS on the second transmission resource (namely, the switching target carrier or the switching target BP).

Figure 11:
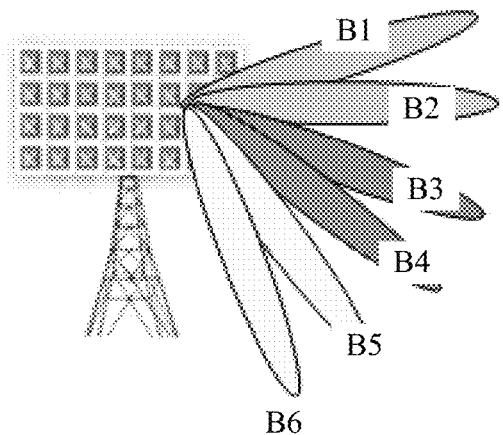
FIG. 11 is a schematic diagram of a beam index according to an embodiment.

As shown in FIG. 11, the base station has six beams with different directions for data transmission. During SRS switching, a beam index used for A-SRS transmission may be indicated by using the group DCI. For example, sending is performed on a beam numbered 4.

The following describes, by using a carrier as an example, a case in detail in which the indication information of the group DCI includes the beam index. When SRS switching is BP-based SRS switching, the described content is also applicable. Details are not described herein again.

This embodiment is similar to the foregoing embodiment in which the indication information of the group DCI includes the SRS symbol location information, and a difference from the foregoing embodiment is that: when A-SRS transmission on the switching target carrier is triggered, the group DCI includes a beam index (beam index) used for A-SRS transmission.

The group DCI in this embodiment includes at least the following information: a TPC command, an SRS request (which may not exist), and beam index information. An example of the group DCI includes the following information: a block number 1, a block number 2, . . . , and a block number B. The group DCI includes information used to indicate one or more terminal devices, and start location indications of different terminal devices in the group DCI are configured by using higher layer signaling or RRC signaling. Based on different quantities of carriers configured for the terminal device, there may be the following two cases.

Case 1: If a quantity of carriers having neither a PUCCH nor a PUSCH and configured for the UE is greater than N, a value of N may be predefined, or configured by using higher layer signaling. In this case, a carrier of a user may be divided into m subsets, one block is allocated to each subset for indication, and each block includes at least the following information: an SRS request: occupying 0 or 2 bits; a TPC command number 1, a TPC command number 2, . . . , and a TPC command number n: occupying 1 or 2 bits; and a beam index 1, a beam index 2, . . . , and a beam index n: occupying 2 bits. n indicates n carriers in the subset, quantities of bits in the foregoing example are merely an example, other values may alternatively be defined, for example, the indication of the beam index may be 2 bits or more, and this is not specifically limited herein.

Case 2: If a quantity of carriers having neither a PUCCH nor a PUSCH and configured for the UE is less than or equal to N, a value of N may be predefined, or configured by using higher layer signaling. In this case, one block may be allocated to each carrier having neither a PUCCH nor a PUSCH of the user for indication. Each block includes at least the following information: an SRS request: occupying 0, 1, or 2 bits; a TPC command number: occupying 1 or 2 bits; and a beam index: occupying 2 bits. The indication of the beam index may be 2 bits or more. This is not specifically limited herein.

In each of the foregoing examples, indication is performed by using a carrier as a unit. In this embodiment, indication performed by using a smaller unit is also supported. For example, indication is performed by using a BP as a unit.

In addition, it should be noted that, the group DCI in this embodiment may include the SRS symbol location information, the precoding information or the codebook, and the beam index. The SRS symbol location information, the precoding information/codebook, and the beam index may coexist, or only one of the SRS symbol location information, the precoding information/codebook, and the beam index may exist. For example, each block includes at least the following information: an SRS request, a TPC command number, an SRS symbol location, an SRS codebook, and a beam index.

In this embodiment, during an SRS switching operation, the beam index or the beam pair index for the SRS is indicated, so that SRS transmission performance on a carrier having neither a PUCCH nor a PUSCH can be improved, thereby meeting transmission requirements in different scenarios.

The foregoing describes the method in various embodiments. The following describes the network device and the terminal device in various embodiments from a perspective of a function module and from a perspective of hardware implementation.

Figure 12:
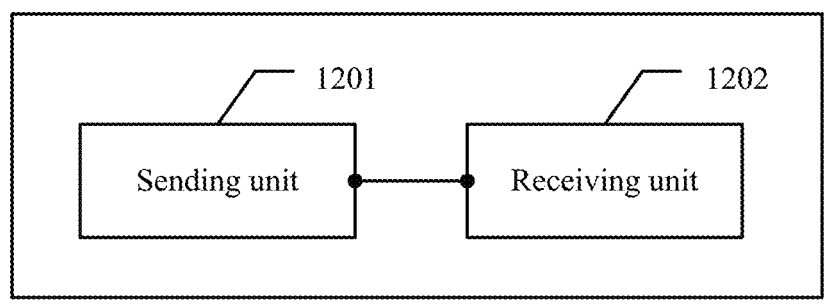
FIG. 12 is a schematic structural diagram of a function module of a network device according to an embodiment.

As shown in FIG. 12, a network device in an embodiment includes the following function units:

a sending unit 1201, configured to send SRS configuration information of a first transmission resource and SRS configuration information of a second transmission resource to a terminal device, where the first transmission resource supports transmission of at least one of a physical uplink control channel PUCCH, a physical uplink shared channel PUSCH, a physical random access channel PRACH, or an SRS signal, the second transmission resource does not support a PUCCH or a PUSCH, the first transmission resource includes a first carrier or a first bandwidth part, the second transmission resource includes a second carrier or a second bandwidth part, the SRS configuration information of the first transmission resource includes a first orthogonal frequency division multiplexing OFDM symbol set, all or some OFDM symbols in the first OFDM symbol set are used by the terminal device to send an SRS on the first transmission resource, the SRS configuration information of the second transmission resource includes a second OFDM symbol set, and all or some OFDM symbols in the second OFDM symbol set are used by the terminal device to send an SRS on the second transmission resource; and a receiving unit 1202, configured to receive the SRS sent by the terminal device.

In some embodiments, in a specific embodiment, the first OFDM symbol set and the second OFDM symbol set that are sent by the sending unit 1201 are different.

In one embodiment, the first OFDM symbol set sent by the sending unit 1201 includes a first OFDM symbol subset and a second OFDM symbol subset, all or some OFDM symbols in the first OFDM symbol subset are used by the terminal device to send a periodic SRS or a semi-persistent SRS on the first transmission resource, all or some OFDM symbols in the second OFDM symbol subset are used by the terminal device to send an aperiodic SRS on the first transmission resource, and the first OFDM symbol subset and the second OFDM symbol subset are different.

In one embodiment, the second OFDM symbol set sent by the sending unit 1201 includes a third OFDM symbol subset and a fourth OFDM symbol subset, all or some OFDM symbols in the third OFDM symbol subset are used by the terminal device to send a periodic SRS or a semi-persistent SRS on the second transmission resource, all or some OFDM symbols in the fourth OFDM symbol subset are used by the terminal device to send an aperiodic SRS on the second transmission resource, and the third OFDM symbol subset and the fourth OFDM symbol subset are different.

In some embodiments, in the SRS configuration information sent by the sending unit 1201, a quantity of OFDM symbols in the third OFDM symbol subset is less than a quantity of OFDM symbols in the fourth OFDM symbol subset.

In some embodiments, in the SRS configuration information sent by the sending unit 1201, a quantity of OFDM symbols in the first OFDM symbol subset is less than a quantity of OFDM symbols in the second OFDM symbol subset.

In one embodiment, the sending unit 1201 is further configured to send group downlink control information group DCI to the terminal device, where the group DCI includes indication information used to indicate one or more terminal devices, the indication information includes SRS symbol location information of the terminal device, and the SRS symbol location information is used to indicate an OFDM symbol location at which the terminal device sends the aperiodic SRS on the second transmission resource.

In one embodiment, the sending unit 1201 is further configured to send group DCI to the terminal device, where the group DCI includes indication information used to indicate one or more terminal devices, the indication information includes precoding information or a codebook of the terminal device, and the precoding information or the codebook is used to indicate precoding or a codebook used by the terminal device to send the aperiodic SRS on the second transmission resource.

In one embodiment, the sending unit 1201 is further configured to send group DCI to the terminal device, where the group DCI includes indication information used to indicate one or more terminal devices, the indication information includes beam index information of the terminal device, and the beam index information is used to indicate a beam index or a beam pair index used by the terminal device to send the aperiodic SRS on the second transmission resource.

In one embodiment, the group DCI sent by the sending unit 1201 is transmitted in a common PDCCH or a group common PDCCH.

For information exchange between function modules of the network device in the embodiment shown in FIG. 12, refer to the foregoing method embodiments (the embodiments shown in FIG. 1 to FIG. 11). Details are not described herein again.

Figure 13:
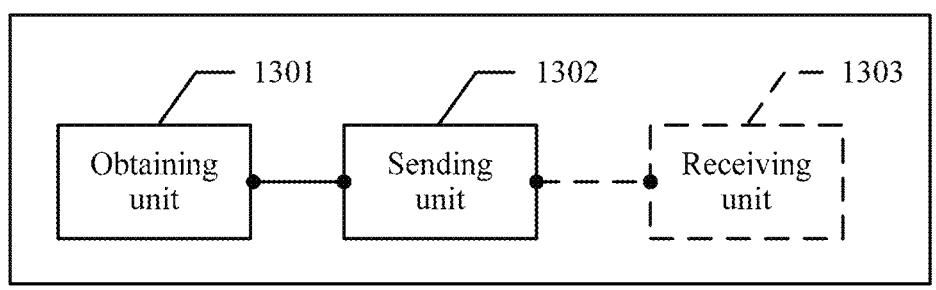
FIG. 13 is a schematic structural diagram of a function module of a terminal device according to an embodiment.

As shown in FIG. 13, a terminal device in an embodiment includes the following function units:

an obtaining unit 1301, configured to obtain SRS configuration information on a first transmission resource and SRS configuration information on a second transmission resource, where the first transmission resource supports transmission of at least one of a physical uplink control channel PUCCH, a physical uplink shared channel PUSCH, a physical random access channel PRACH, or an SRS signal, the second transmission resource does not support a PUCCH or a PUSCH, the first transmission resource includes a first carrier or a first bandwidth part, the second transmission resource includes a second carrier or a second bandwidth part, the SRS configuration information of the first transmission resource includes a first orthogonal frequency division multiplexing OFDM symbol set, and the SRS configuration information of the second transmission resource includes a second OFDM symbol set; and a sending unit 1302, configured to send an SRS on the first transmission resource by using all or some OFDM symbols in the first OFDM symbol set, and further configured to send an SRS on the second transmission resource by using all or some OFDM symbols in the second OFDM symbol set.

In one embodiment, the first OFDM symbol set and the second OFDM symbol set that are obtained by the obtaining unit 1301 are different.

In one embodiment, the first OFDM symbol set obtained by the obtaining unit 1301 includes a first OFDM symbol subset and a second OFDM symbol subset, and the first OFDM symbol subset and the second OFDM symbol subset are different. The sending unit 1302 is specifically configured to send a periodic SRS or a semi-persistent SRS on the first transmission resource by using all or some OFDM symbols in the first OFDM symbol subset; or send an aperiodic SRS on the first transmission resource by using all or some OFDM symbols in the second OFDM symbol subset.

In one embodiment, the second OFDM symbol set obtained by the obtaining unit 1301 includes a third OFDM symbol subset and a fourth OFDM symbol subset, and the third OFDM symbol subset and the fourth OFDM symbol subset are different. The sending unit 1302 is specifically configured to send a periodic SRS or a semi-persistent SRS on the second transmission resource by using all or some OFDM symbols in the third OFDM symbol subset; or send an aperiodic SRS on the second transmission resource by using all or some OFDM symbols in the fourth OFDM symbol subset.

In some embodiments, in the SRS configuration information obtained by the obtaining unit 1301, a quantity of OFDM symbols in the third OFDM symbol subset is less than a quantity of OFDM symbols in the fourth OFDM symbol subset.

In some embodiments, in the SRS configuration information obtained by the obtaining unit 1301, a quantity of OFDM symbols in the first OFDM symbol subset is less than a quantity of OFDM symbols in the second OFDM symbol subset.

In one embodiment, the terminal device further includes:

a receiving unit 1303, configured to receive group downlink control information group DCI sent by the network device, where the group DCI includes indication information used to indicate one or more terminal devices, the indication information includes SRS symbol location information of the terminal device, and the SRS symbol location information is used to indicate an OFDM symbol location at which the terminal device sends the aperiodic SRS on the second transmission resource.

In one embodiment, the receiving unit 1303 is further configured to receive group DCI sent by the network device, where the group DCI includes indication information used to indicate one or more terminal devices, the indication information includes precoding information or a codebook of the terminal device, and the precoding information or the codebook is used to indicate precoding or a codebook used by the terminal device to send the aperiodic SRS on the second transmission resource.

In one embodiment, the receiving unit 1303 is further configured to receive group DCI sent by the network device, where the group DCI includes indication information used to indicate one or more terminal devices, the indication information includes beam index information of the terminal device, and the beam index information is used to indicate a beam index or a beam pair index used by the terminal device to send the aperiodic SRS on the second transmission resource.

In one embodiment, the group DCI received by the receiving unit 1303 is transmitted in a common PDCCH or a group common PDCCH.

For information exchange between function modules of the terminal device in the embodiment shown in FIG. 13, refer to the foregoing method embodiments (the embodiments shown in FIG. 1 to FIG. 11). Details are not described herein again.

In another example design, functions corresponding to the function modules shown in FIG. 12, and functions implemented by the network device in the embodiments shown in FIG. 1 to FIG. 11 may be implemented by a chip or a chip system. The chip system may include a chip, or may include a chip and another discrete device.

In another example design, functions corresponding to the function modules shown in FIG. 13, and functions implemented by the terminal device in the embodiments shown in FIG. 1 to FIG. 11 may be implemented by a chip or a chip system. The chip system may include a chip, or may include a chip and another discrete device.

The chip in this embodiment includes a processing unit and a communications unit. The processing unit may be, for example, a processor. The communications unit may be, for example, an input/output interface, a pin, or a circuit. The processing unit may execute a computer executable instruction stored in a storage unit, so that the chip performs the communication method in the embodiments shown in FIG. 1 to FIG. 11. Optionally, the storage unit is a storage unit inside the chip, for example, a register or a buffer. The storage unit may be alternatively a storage unit located outside the chip and in the terminal, for example, a read-only memory (read-only memory, ROM), or a static storage device of another type that can store static information and an instruction, or a random access memory (random access memory, RAM). The processor may be a general-purpose central processing unit (CPU), a microprocessor, an application-specific integrated circuit (application-specific integrated circuit, ASIC), or one or more integrated circuits that are configured to control execution of a program in the communication method.

Figure 14:
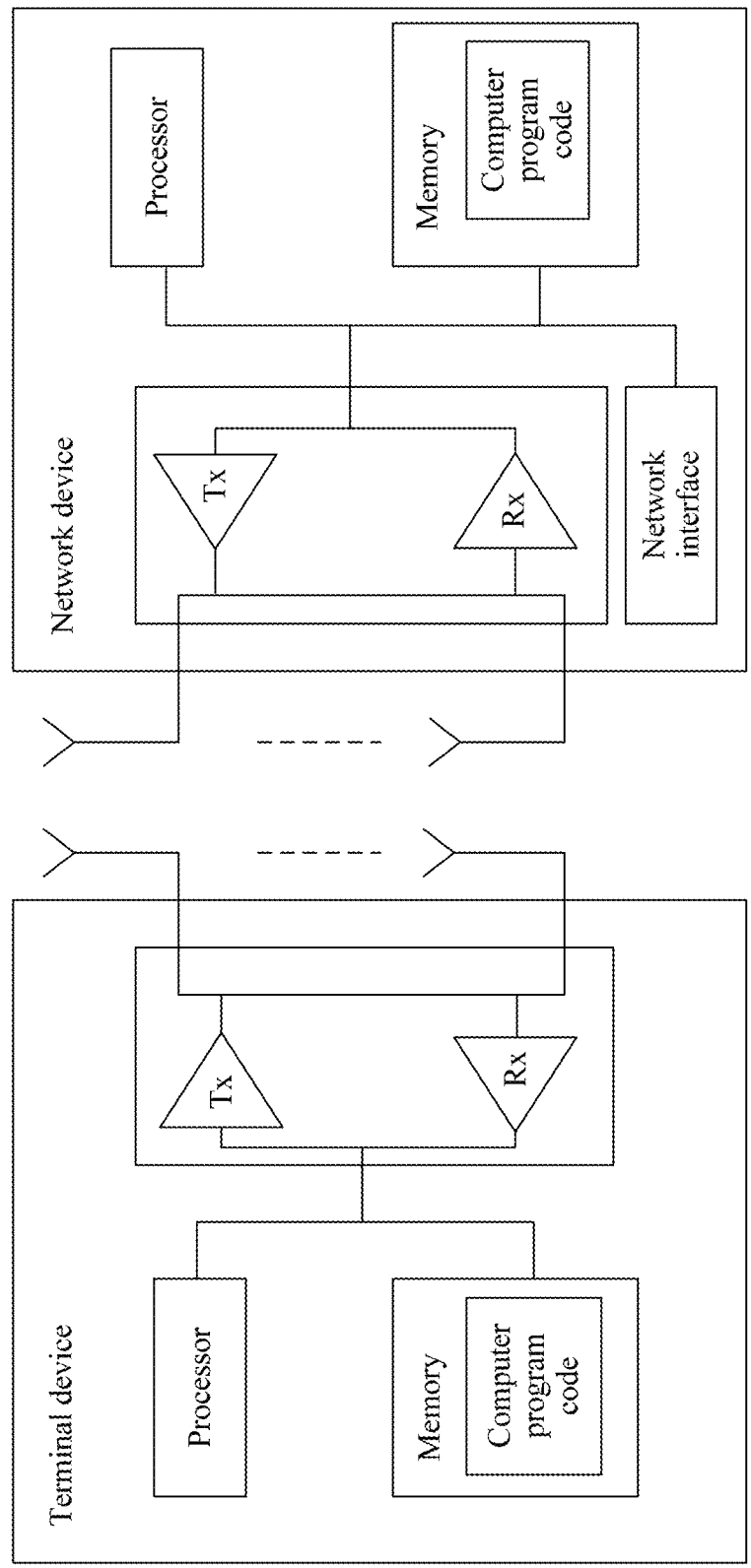
FIG. 14 is a schematic structural diagram of hardware of a network device and a terminal device according to an embodiment.

FIG. 14 is a schematic structural diagram of hardware of a network device and a terminal device in this application. The network device may be specifically the base station shown in FIG. 1. The terminal device may be the UE shown in FIG. 1. The terminal device and the network device in an implementation of this application respectively have functions of the terminal device and the network device in the method embodiments.

The terminal device and the network device are directly connected by using a radio frequency or a baseband. The network device provides wireless access of the terminal device to a network, and includes one or more processors, one or more memories, one or more network interfaces, and one or more transceivers (each transceiver includes a receiver Rx and a transmitter Tx) that are connected by using a bus. The one or more transceivers are connected to an antenna or an antenna array. The one or more processors include computer program code. The network interface is connected to a core network through a link (for example, a link to the core network), or connected to another network device through a wired or wireless link. The processor executes a series of computer program code and instruction operations in the memory, to perform all or some steps performed by the network device in the method embodiments (the embodiments shown in FIG. 1 to FIG. 11).

The terminal device includes one or more processors, one or more memories, one or more transceivers (each transceiver includes a transmitter Tx and a receiver Rx) that are connected by using a bus. The one or more transceivers are connected to one or more antennas. The one or more memories include computer program code. The processor executes a series of computer program code and instruction operations in the memory, to perform all or some steps performed by the terminal device in the method embodiments (the embodiments shown in FIG. 1 to FIG. 11).

Figure 15:
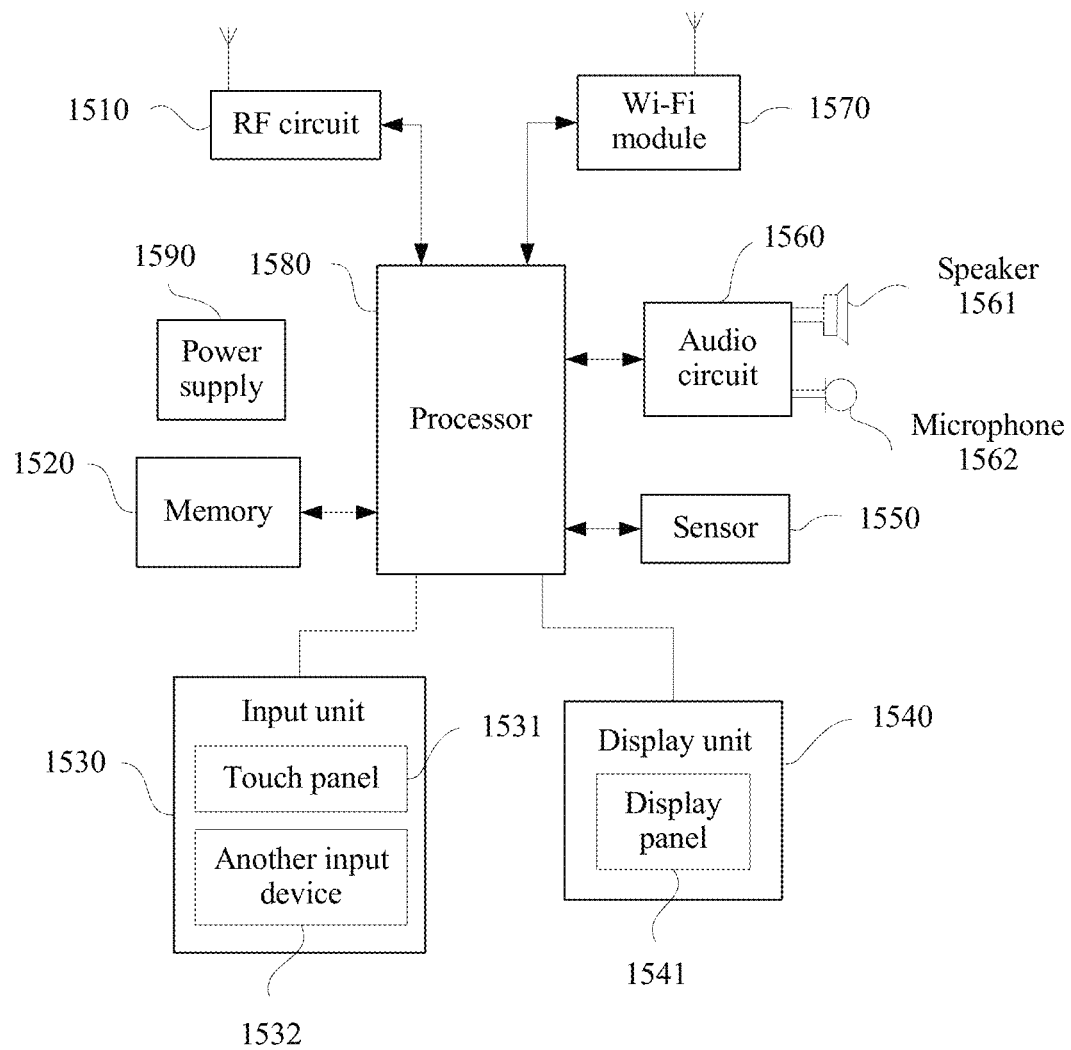
FIG. 15 is a schematic structural diagram of hardware of a terminal device according to an embodiment.

The following describes in detail a hardware structure of a terminal device with reference to FIG. 15. FIG. 15 is a block diagram of a partial hardware structure of a terminal device. The terminal device includes components such as a radio frequency (Radio Frequency, RF) circuit 1510, a memory 1520, an input unit 1530, a display unit 1540, a sensor 1550, an audio circuit 1560, a wireless fidelity (wireless fidelity, WiFi) module 1570, a processor 1580, and a power supply 1590. It can be understood by persons skilled in the art that, a terminal device structure shown in FIG. 15 does not constitute any limitation on the terminal device, and the terminal device may include more or fewer components than those shown in the figure, or combine some components, or have different component arrangements.

The components of the terminal device are specifically described with reference to FIG. 15.

The RF circuit 1510 may be configured to receive and send signals in an information receiving and sending process or during a call. Particularly, after receiving downlink information from a base station, the RF circuit 1510 sends the downlink information to the processor 1580 for processing. In addition, the RF circuit 1510 sends uplink data to the base station. Usually, the RF circuit 1510 includes but is not limited to an antenna, at least one amplifier, a transceiver, a coupler, a low noise amplifier (Low Noise Amplifier, LNA), a duplexer, and the like. In addition, the RF circuit 1510 may further communicate with a network and another device through wireless communication. The wireless communication may use any communication standard or protocol, including but not limited to, GSM, a general packet radio service (general packet radio service, GPRS), CDMA, wideband code division multiple access (wideband code division multiple access, WCDMA), LTE, email, or short message service (short messaging service, SMS).

The memory 1520 may be configured to store a software program and a module. The processor 1580 runs the software program and the module that are stored in the memory 1520, to perform various function applications of the terminal device and data processing. The memory 1520 may mainly include a program storage area and a data storage area. The program storage area may store an operating system, an application program required by at least one function (such as a sound playing function and an image playing function), and the like. The data storage area may store data (such as audio data and an address book) created based on use of the terminal device, and the like. In addition, the memory 1520 may include a high speed random access memory, and may also include a non-volatile memory, such as at least one magnetic disk storage device, a flash storage device, or another volatile solid-state storage device.

The input unit 1530 may be configured to receive input digit or character information, and generate a key signal input related to a user setting and function control of the terminal device. Specifically, the input unit 1530 may include a touch panel 1531 and another input device 1532. The touch panel 1531, also referred to as a touchscreen, may collect a touch operation of the user on or near the touch panel 1531 (such as an operation of the user on or near the touch panel 1531 by using any suitable object or accessory such as a finger or a stylus), and drive a corresponding connection apparatus based on a preset program. Optionally, the touch panel 1531 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and then sends the touch point coordinates to the processor 1580. Moreover, the touch controller can receive and execute a command sent by the processor 1580. In addition, the touch panel 1531 may be of a resistive type, a capacitive type, an infrared type, a surface acoustic wave type, or the like. In addition to the touch panel 1531, the input unit 1530 may further include another input device 1532. Specifically, the another input device 1532 may include, but is not limited to, one or more of a physical keyboard, a functional button (such as a sound volume control button or a power button), a trackball, a mouse, or a joystick.

The display unit 1540 may be configured to display information entered by a user or information provided for a user. The display unit 1540 may include a display panel 1541. In some embodiments, the display panel 1541 may be configured in a form of a liquid crystal display (liquid crystal display, LCD), an organic light-emitting diode (organic light-emitting diode, OLED), or the like. Further, the touch panel 1531 may cover the display panel 1541. After detecting a touch operation on or near the touch panel 1531, the touch panel 1531 transfers the touch operation to the processor 1580, to determine a type of a touch event. Subsequently, the processor 1580 provides a corresponding visual output on the display panel 1541 based on the type of the touch event. Although in FIG. 15, the touch panel 1531 and the display panel 1541 are used as two separate components to implement input and input functions of the terminal device, in some embodiments, the touch panel 1531 and the display panel 1541 may be integrated to implement the input and output functions of the terminal device.

The terminal device may further include at least one sensor 1550, such as a light sensor, a motion sensor, and another sensor. Specifically, the light sensor may include an ambient light sensor and a proximity sensor. The ambient light sensor may adjust brightness of the display pane 1541 according to luminance of ambient light, and the proximity sensor may disable the display panel 1541 and/or backlight when the terminal device approaches an ear. As a type of motion sensor, the acceleration sensor can detect a value of an acceleration in each direction (generally three axes), and detect a value and a direction of gravity when the acceleration sensor is static, and is applicable to an application for recognizing a terminal device posture (for example, switching between a landscape screen and a portrait screen, related games, and magnetometer posture calibration), a function related to vibration recognition (such as a pedometer or a knock), and the like. Other sensors such as a gyroscope, a barometer, a hygrometer, a thermometer, and an infrared sensor may also be disposed on the terminal device. Details are not described herein.

The audio circuit 1560, a speaker 1561, and a microphone 1562 may provide an audio interface between the user and the terminal device. The audio circuit 1560 may transmit, to the speaker 1561, an electrical signal that is obtained after conversion of received audio data, and the speaker 1561 converts the electrical signal into an acoustic signal and outputs the acoustic signal. In addition, the microphone 1562 converts a collected acoustic signal into an electrical signal, the audio circuit 1560 receives and converts the electrical signal into audio data, and outputs the audio data to the processor 1580 for processing, and then processed audio data is sent to, for example, another terminal device, by using the RF circuit 1510, or the audio data is output to the memory 1520 for further processing.

Wi-Fi belongs to a short distance wireless transmission technology. The terminal device may help, by using the Wi-Fi module 1570, a user receive and send an email, browse a web page, and access streaming media, and the like. This provides wireless broadband Internet access for the user. Although FIG. 15 shows the Wi-Fi module 1570, it may be understood that, the Wi-Fi module 1570 is not a mandatory component of the terminal device, and when required, the Wi-Fi module 1570 may be omitted provided that the scope of the essence of the present invention is not changed.

The processor 1580 is a control center of the terminal device, is connected to each part of the entire terminal device by using various interfaces and lines, and performs various functions of the terminal device and data processing by running or executing the software program and/or the module that are/is stored in the memory 1520 and invoking data stored in the memory 1520, to perform overall monitoring on the terminal device. Optionally, the processor 1580 may include one or more processing units. Optionally, an application processor and a modem processor may be integrated into the processor 1580, where the application processor mainly processes an operating system, a user interface, an application program, and the like, and the modem processor mainly processes wireless communication. It may be understood that the foregoing modem processor may alternatively not be integrated into the processor 1580. In this embodiment, the processor 1580 is configured to perform all or some steps performed by the terminal device in the method embodiments (the embodiments shown in FIG. 1 to FIG. 11).

The terminal device further includes the power supply 1590 (for example, a battery) that supplies power to the components. Preferably, the power supply may be logically connected to the processor 1580 by using a power management system, to implement functions, such as charge management, discharge management, and power consumption management, by using the power management system.

Although not shown in the figure, the terminal device may further include a camera, a Bluetooth module, and the like, and details are not described herein.

It should be understood that all or some of the foregoing embodiments may be implemented by using software, hardware, firmware, or a combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to various embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way is interchangeable in proper circumstances so that various embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in various embodiments may be integrated into one processing unit, or each of the units may exist alone physically, or two or more units are integrated into one unit. The integrated unit may be implemented in a form of hardware, or may be implemented in a form of a software functional unit. When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in various embodiments. The foregoing storage medium includes any medium that can store program code, such as a USB flash drive, a removable hard disk, a read-only memory, a random access memory, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of various embodiments.

What is claimed is:

1. A communication method, wherein the method comprises:

sending, by a network device, sounding reference signal (SRS) configuration information of a first transmission resource and SRS configuration information of a second transmission resource to a terminal device, wherein the first transmission resource supports transmission of at least one of a physical uplink control channel (PUCCH), a physical uplink shared channel (PUSCH), a physical random access channel (PRACH), or an SRS signal, the second transmission resource does not support a PUCCH or a PUSCH, the first transmission resource comprises a first carrier or a first bandwidth part, and the second transmission resource comprises a second carrier or a second bandwidth part, wherein the SRS configuration information of the first transmission resource comprises a first orthogonal frequency division multiplexing (OFDM) symbol set, all or some OFDM symbols in the first OFDM symbol set being used by the terminal device to send an SRS on the first transmission resource, and the SRS configuration information of the second transmission resource comprises a second OFDM symbol set, all or some OFDM symbols in the second OFDM symbol set being used by the terminal device to send an SRS on the second transmission resource.

2. The method according to claim 1, wherein
the first OFDM symbol set and the second OFDM symbol set are different.

3. The method according to claim 1, wherein
the first OFDM symbol set comprises a first OFDM symbol subset and a second OFDM symbol subset, all or some OFDM symbols in the first OFDM symbol subset are used by the terminal device to send a periodic SRS or a semi-persistent SRS on the first transmission resource, wherein all or some OFDM symbols in the second OFDM symbol subset are used by the terminal device to send an aperiodic SRS on the first transmission resource, and the first OFDM symbol subset and the second OFDM symbol subset are different.

4. The method according to claim 1, wherein
the second OFDM symbol set comprises a third OFDM symbol subset and a fourth OFDM symbol subset, all or some OFDM symbols in the third OFDM symbol subset are used by the terminal device to send a periodic SRS or a semi-persistent SRS on the second transmission resource, wherein all or some OFDM symbols in the fourth OFDM symbol subset are used by the terminal device to send an aperiodic SRS on the second transmission resource, and the third OFDM symbol subset and the fourth OFDM symbol subset are different.

5. The method according to claim 1, wherein the method further comprises:
sending, by the network device, group downlink control information group DCI to the terminal device, wherein the group DCI comprises indication information indicating one or more terminal devices, the indication information comprising SRS symbol location information of the terminal device, the SRS symbol location information indicating an OFDM symbol location at which the terminal device sends the aperiodic SRS on the second transmission resource.

6. The method according to claim 5, wherein the group DCI is transmitted in a common PDCCH or a group common PDCCH.

7. The method according to claim 1, wherein the method further comprises:
sending, by the network device, group DCI to the terminal device, wherein the group DCI comprises indication information indicating one or more terminal devices, the indication information comprising precoding information or a codebook of the terminal device, the precoding information or the codebook indicating precoding or a codebook used by the terminal device to send the aperiodic SRS on the second transmission resource.

8. The method according to claim 1, wherein the method fruther comprises: sending, by the network device, group DCI to the terminal device, wherein the group DCI comprises indication information indicating one or more terminal devices, the indication information comprising beam index information of the terminal device, the beam index information indicateing a beam index or a beam pair index used by the terminal device to send the aperiodic SRS on the second transmission resource.

9. A communication method, wherein the method comprises:
obtaining, by a terminal device, sounding reference signal (SRS) configuration information on a first transmission resource and SRS configuration information on a second transmission resource, wherein the first transmission resource supports transmission of at least one of a physical uplink control channel (PUCCH), a physical uplink shared channel (PUSCH), a physical random access channel (PRACH), or an SRS signal, the second transmission resource does not support a PUCCH or a PUSCH, the first transmission resource comprises a first carrier or a first bandwidth part, and the second transmission resource comprises a second carrier or a second bandwidth part;
sending, by the terminal device, an SRS on the first transmission resource by using all or some OFDM symbols in a first OFDM symbol set, wherein the SRS configuration information of the first transmission resource comprises the first orthogonal frequency division multiplexing OFDM symbol set; and
sending, by the terminal device, an SRS on the second transmission resource by using all or some OFDM symbols in a second OFDM symbol set, wherein the SRS configuration information of the second transmission resource comprises the second OFDM symbol set.

10. The method according to claim 9, wherein
the first OFDM symbol set and the second OFDM symbol set are different.

11. The method according to claim 9, wherein
the first OFDM symbol set comprises a first OFDM symbol subset and a second OFDM symbol subset, and the first OFDM symbol subset and the second OFDM symbol subset are different; and
the method further comprises:
sending, by the terminal device, a periodic SRS or a semi-persistent SRS on the first transmission resource by using all or some OFDM symbols in the first OFDM symbol subset; and
sending, by the terminal device, an aperiodic SRS on the first transmission resource by using all or some OFDM symbols in the second OFDM symbol subset.

12. The method according to claim 9, wherein
the second OFDM symbol set comprises a third OFDM symbol subset and a fourth OFDM symbol subset, and the third OFDM symbol subset and the fourth OFDM symbol subset are different; and
the method further comprises:
sending, by the terminal device, a periodic SRS or a semi-persistent SRS on the second transmission resource by using all or some OFDM symbols in the third OFDM symbol subset; and
sending, by the terminal device, an aperiodic SRS on the second transmission resource by using all or some OFDM symbols in the fourth OFDM symbol subset.

13. The method according to claim 9, wherein the method further comprises:
receiving, by the terminal device, group downlink control information group DCI sent by the network device, wherein the group DCI comprises indication information used to indicate one or more terminal devices, the indication information comprising SRS symbol location information of the terminal device, and the SRS symbol location information indicating an OFDM symbol location at which the terminal device sends the aperiodic SRS on the second transmission resource.

14. The method according to claim 13, wherein the group DCI is transmitted in a common PDCCH or a group common PDCCH.

15. The method according to claim 9, wherein the method further comprises:
receiving, by the terminal device, group downlink control information group DCI sent by the network device, wherein the group DCI comprises indication information indicating one or more terminal devices, the indication information comprising precoding information or a codebook of the terminal device, and the precoding information or the codebook indicating precoding or a codebook used by the terminal device to send the aperiodic SRS on the second transmission resource.

16. The method according to claim 9, wherein the method further comprises: receiving, by the terminal device, group downlink control information group DCI sent by the network device, wherein the group DCI comprises indication information used to indicate one or more terminal devices, the indication information comprising beam index information of the terminal device, and the beam index informaion is indicating a beam index or a beam pair index used by the terminal device to send the aperiodic SRS on the second trans mission resource.

17. A network device, wherein the network device comprises:
a sending unit, configured to send sounding reference signal (SRS) configuration information of a first transmission resource and SRS configuration information of a second transmission resource to a terminal device, wherein the first transmission resource supports transmission of at least one of a physical uplink control channel (PUCCH), a physical uplink shared channel (PUSCH), a physical random access channel (PRACH), or an SRS signal, the second transmission resource does not support a PUCCH or a PUSCH, the first transmission resource comprises a first carrier or a first bandwidth part, the second transmission resource comprises a second carrier or a second bandwidth part, the SRS configuration information of the first transmission resource comprises a first orthogonal frequency division multiplexing OFDM symbol set, all or some OFDM symbols in the first OFDM symbol set are used by the terminal device to send an SRS on the first transmission resource, the SRS configuration information of the second transmission resource comprises a second OFDM symbol set, and all or some OFDM symbols in the second OFDM symbol set are used by the terminal device to send an SRS on the second transmission resource; and
a receiving unit, configured to receive the SRS sent by the terminal device.

18. The network device according to claim 17, wherein the first OFDM symbol set and the second OFDM symbol set that are sent by the sending unit are different.

19. The network device according to claim 17, wherein the first OFDM symbol set sent by the sending unit comprises a first OFDM symbol subset and a second OFDM symbol subset, all or some OFDM symbols in the first OFDM symbol subset are used by the terminal device to send a periodic SRS or a semi-persistent SRS on the first transmission resource, all or some OFDM symbols in the second OFDM symbol subset are used by the terminal device to send an aperiodic SRS on the first transmission resource, and the first OFDM symbol subset and the second OFDM symbol subset are different.

20. The network device according to claim 17, wherein the second OFDM symbol set sent by the sending unit comprises a third OFDM symbol subset and a fourth OFDM symbol subset, all or some OFDM symbols in the third OFDM symbol subset are used by the terminal device to send a periodic SRS or a semi-persistent SRS on the second transmission resource, all or some OFDM symbols in the fourth OFDM symbol subset are used by the terminal device to send an aperiodic SRS on the second transmission resource, and the third OFDM symbol subset and the fourth OFDM symbol subset are different.

\* \* \* \* \*

UNITED STATES PATENT AND TRADEMARK OFFICE
CERTIFICATE OF CORRECTION

PATENT NO. : 10,999,103 B2  
APPLICATION NO. : 16/584883  
DATED : May 4, 2021  
INVENTOR(S) : Dongdong Wei et al.

Page 1 of 1

It is certified that error appears in the above-identified patent and that said Letters Patent is hereby corrected as shown below:

In the Claims

Column 37, Lines 46 and 47, please delete "PDCCII" and insert --PDCCH--.

Column 37, Line 60, please delete "fruther" and insert --further-- before "comprises".

Column 39, Line 21, please delete "informaion" and insert --information-- after "index".

Column 39, Line 24, please delete "trans mission" and insert --transmission-- before "resource".

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*